(12) United States Patent
Domke et al.

(10) Patent No.: US 9,589,590 B2
(45) Date of Patent: Mar. 7, 2017

(54) ANTI-PIRACY FEATURE FOR OPTICAL DISCS

(71) Applicant: Microsoft Corporation, Redmond, WA (US)

(72) Inventors: Felix Domke, Hamburg (DE); Kenneth M McGrail, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/502,390

(22) Filed: Sep. 30, 2014

(65) Prior Publication Data

US 2016/0093324 A1    Mar. 31, 2016

(51) Int. Cl.
*G11B 5/09* (2006.01)
*G11B 20/12* (2006.01)
(Continued)

(52) U.S. Cl.
CPC ........ *G11B 20/00601* (2013.01); *G11B 7/007* (2013.01); *G11B 7/14* (2013.01);
(Continued)

(58) Field of Classification Search
CPC .................. G11B 20/1217; G11B 5/09; G11B 2020/1238; G11B 2020/1292;
(Continued)

(56) References Cited

U.S. PATENT DOCUMENTS 6,452,886 B1    9/2002    Carvennec
6,992,959 B1    1/2006    Tosaki et al.
(Continued)

FOREIGN PATENT DOCUMENTS

JP    H08147767 A    6/1996

OTHER PUBLICATIONS

New Cyberian, "Adding CSS Copy Protection to DVD", Retrieved on Aug. 6, 2014 from <<http://www.newcyberian.com/howto_add_css.html>>, Aug. 2007, 2 pages.
(Continued)

*Primary Examiner* — Dionne H Pendleton
(74) *Attorney, Agent, or Firm* — Tim Churna; Dan Choi; Micky Minhas

(57) ABSTRACT

Disclosed are techniques and systems for manufacturing an optical disc having a stochastic (i.e., non-deterministic) anti-piracy feature in the form of a multi-spiral structure, and for verifying the feature on the optical disc to authenticate the disc for playback. The multi-spiral structure may be comprised of multiple partially interleaved, and partially overlapping, spiral data tracks formed in a designated area of the optical disc. A process of forming the multi-spiral structure may include forming, in the designated area, a first spiral data track with first track pitch and a second spiral data track with second track pitch that is different than the first track pitch. The multi-spiral structure may be analyzed to determine verification parameters for verifying the multi-spiral structure, and those verification parameters may be encrypted so that they may be subsequently decrypted and used to verify the multi-spiral structure on a disc reading device.

16 Claims, 9 Drawing Sheets

(51) Int. Cl.

| | | |
|---|---|---|
| *G11B 20/10* | (2006.01) | |
| *G11B 20/00* | (2006.01) | |
| *G11B 7/14* | (2012.01) | |
| *G11B 7/24091* | (2013.01) | |
| *G11B 7/26* | (2006.01) | |
| *G11B 7/24076* | (2013.01) | |
| *G11B 7/007* | (2006.01) | |

(52) U.S. Cl.
CPC ...... *G11B 7/24076* (2013.01); *G11B 7/24091* (2013.01); *G11B 7/261* (2013.01); *G11B 20/00086* (2013.01); *G11B 20/00123* (2013.01); *G11B 20/00695* (2013.01); *G11B 2007/00709* (2013.01); *G11B 2007/00727* (2013.01)

(58) Field of Classification Search
CPC . G11B 20/10046; G11B 5/012; G11B 19/045; G11B 2005/001; G11B 2020/1295; G11B 2020/1297; G11B 20/10009; G11B 20/10055; G11B 20/10527; G11B 20/1254; G11B 20/1258; G11B 20/1833; G11B 20/22; G11B 2220/2516; G11B 5/02; G11B 5/3958; G11B 5/4886; G11B 5/59633; G11B 5/59638; G11B 5/59655; G11B 5/59661; G11B 5/59688; G11B 7/0045; G11B 7/007; G11B 7/08505; G11B 7/0903; G11B 7/0938; G11B 7/24047; G11B 7/24073; G11B 7/24094; G11B 7/261; G11B 2005/0024; G11B 2020/1281; G11B 2020/1284; G11B 20/12; G11B 21/21; G11B 5/59627; G11B 5/6011; G11B 5/607; G11B 3/38; G11B 3/78; G11B 2007/00709; G11B 2007/00727; G11B 7/00754; G11B 7/14; G11B 7/2407; G06F 2211/1016; G06F 12/0238; G06F 2206/1014; G06F 2212/1044; G06F 2212/152; G06F 2212/21; G06F 2212/70; G06F 3/061; G06F 3/0655; G06F 3/0677; G06F 3/0679; H01F 27/2804; H03M 13/09; H03M 13/1102; H03M 13/27; H03M 13/373; H03M 13/3761; A63F 2300/207
See application file for complete search history.

(56) References Cited

U.S. PATENT DOCUMENTS

| | | | |
|---|---|---|---|
| 8,051,291 | B2 | 11/2011 | Benedikt |
| 8,724,245 | B1 | 5/2014 | Smith et al. |
| 9,007,710 | B1* | 4/2015 | Liu .................. G11B 20/10527 360/48 |
| 2002/0136124 | A1 | 9/2002 | Pirot et al. |
| 2004/0168025 | A1 | 8/2004 | Carson |
| 2007/0064545 | A1 | 3/2007 | Carson et al. |
| 2009/0144763 | A1 | 6/2009 | Hurst, Jr. et al. |
| 2009/0158044 | A1 | 6/2009 | Kirovski |
| 2010/0239088 | A1 | 9/2010 | Torbarac |
| 2011/0007893 | A1 | 1/2011 | Sunar et al. |
| 2011/0286315 | A1 | 11/2011 | Gotoh et al. |
| 2013/0290737 | A1 | 10/2013 | Shuster |
| 2015/0126288 | A1* | 5/2015 | Okino .............. G11B 20/10527 463/43 |

OTHER PUBLICATIONS

Hammouri, et al., "CDs Have Fingerprints Too", Proceedings of the 11th International Workshop on Cryptographic Hardware and Embedded Systems, Aug. 2009, 15 pages.

PCT Search Report & Written Opinion for Application No. PCT/US2015/052760, mailed on Dec. 21, 2015, 11 Pages.

PCT Written Opinion of the International Preliminary Examining Authority mailed Jun. 22, 2016 for PCT application No. PCT/US2015/052760, 5 pages.

* cited by examiner

ANTI-PIRACY FEATURE FOR OPTICAL DISCS

BACKGROUND

Optical media is used for recording and storing digital content, such as software products, movies, video games, and the like. A number of copy protection technologies and schemes have been developed to prevent unauthorized copying of such content. For example, a copy protection feature may be added to an optical disc so that the disc may be authenticated based on the copy protection feature. The only way to replicate the disc so that it is playable on a disc player is to discover the secret process and/or software algorithm that was used to create the copy protection feature. Hence, existing anti-piracy techniques rely predominantly on maintaining the secrecy of the custom process and/or algorithm that is used to add the copy protection feature to the disc. Given enough time and resources, however, unauthorized manufacturers can typically discover the exact method or algorithm used for a copy protection feature by analyzing authentic discs with commonly available equipment, such as disc testers and microscopes. Once the exact method or algorithm is known to the unauthorized manufacturer, it may be used to add the same, deterministic copy protection feature to the disc, allowing the unauthorized manufacturer to repeat the process and mass produce illegal discs that will pass the anti-piracy validation.

SUMMARY

Described herein are techniques and systems for manufacturing an optical disc having a stochastic (i.e., non-deterministic) anti-piracy feature, as well as techniques and systems for verifying the stochastic anti-piracy feature on the optical disc in order to authenticate the optical disc for playback. Particularly, the stochastic anti-piracy feature in the form of a multi-spiral structure may be deliberately formed in a predetermined area of an optical disc during a disc mastering process to act as a unique, per-master fingerprint that is used to authorize playback of the optical discs on consumer devices. A consumer device may detect illegal copies of an optical disc by attempting, but failing, to verify a multi-spiral structure on the optical disc, thereby preventing playback of a pirated optical disc.

In some embodiments, a first spiral data track having a first track pitch may be formed in the designated area. A second spiral data track may then be formed in the designated area so that the second spiral data track partially interleaves, and partially overlaps, the first spiral data track.

After the multi-spiral structure is created, it may be analyzed to determine its characteristics, and those characteristics may be measured to obtain verification parameters of the multi-spiral structure. The verification parameters may be encrypted so that they may be subsequently decrypted and used by optical disc reading devices to verify the multi-spiral structure during a disc authentication process.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
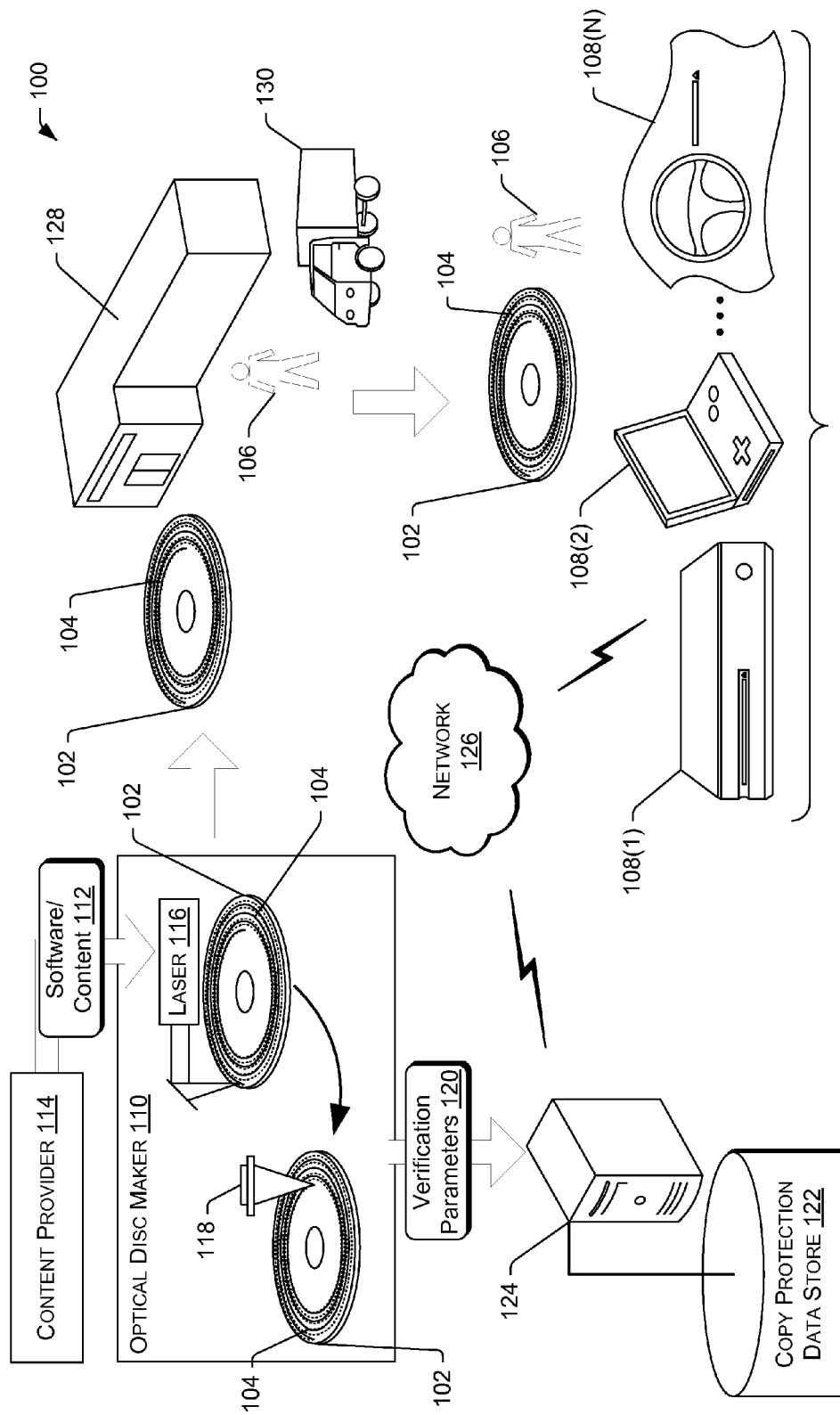
FIG. 1 illustrates an example system architecture for manufacturing optical discs having a stochastic anti-piracy feature, and for distributing copy-protected discs to consumers to be authorized for playback on optical disc reading devices.

Embodiments of the present disclosure are directed to, among other things, techniques and systems for manufacturing an optical disc having a stochastic anti-piracy feature, as well as techniques and systems for authenticating an optical disc based on verifying the stochastic anti-piracy feature on the disc. Although examples provided herein are predominantly described with reference to Blu-ray discs as an optical disc medium format, it is to be appreciated that the techniques and systems described herein are not limited to Blu-ray discs. For instance, other digital optical disc data storage formats (e.g., digital versatile disc (DVD), high definition DVD (HD DVD), compact disc (CD), and/or any other suitable present or future digital optical disc data storage format) may benefit from the techniques and systems herein without changing the basic characteristics of the system. Additionally, optical discs may store any suitable content to be protected, such as music, movies, navigation-related content (e.g., street maps), software programs/products, games, and so on.

A stochastic anti-piracy feature in the form of a multi-spiral structure may be deliberately formed in a predetermined area of an optical disc during a disc mastering process to act as a unique, per-master fingerprint that is used to authorize playback of the optical discs on consumer devices. The multi-spiral structure that makes up the stochastic anti-piracy feature may be comprised of multiple partially interleaved, and partially overlapping, spiral data tracks formed in a designated area or portion of the optical disc.

Any number of spiral data tracks may be used to create the multi-spiral structure. For illustrative purposes, many of the examples provided herein describe forming two spiral data tracks (i.e., a first spiral data track and a second spiral data track) in a designated area of the optical disc to create the multi-spiral structure.

During formation of the multi-spiral structure, the second spiral data track may start from a position that is proximate to the start position of the first spiral data track. Due to physical limitations of the manufacturing equipment (i.e., a laser beam recorder (LBR)) involved in forming the spiral data tracks, the initial alignment of the recording head of the LBR may deviate slightly from the start position of the first spiral data track upon initially forming the second spiral data track. This slight deviation causes the resulting pattern of the multi-spiral structure to be unpredictable and very difficult to replicate. That is, the resulting multi-spiral structure is stochastic (i.e., non-deterministic) in nature due to the positioning repeatability of the LBR used to form spiral data tracks on the optical disc. As a result, one is unable to predict exactly where the multiple spiral tracks of the multi-spiral structure will overlap and exactly where the tracks will interleave with each other. To ensure that the second spiral data track does not entirely overlap the first spiral data track, the second spiral data track may have a second track pitch that is different than the first track pitch of the first spiral data track. The resulting pattern of the first and second spiral data tracks will have overlapping tracks in some portions of the multi-spiral structure, and interleaving (i.e., not overlapping) tracks in other portions of the multi-spiral structure that may be determined after the creation of the multi-spiral structure, but not predicted in advance.

Interference (overlap) between two written spiral data tracks on an optical disc is typically considered an error source that is to be avoided because it leads to unreadable data tracks. This would hold true if the data tracks in question were to store the data corresponding to the actual content of the optical disc that is to be output to users via a display and/or speakers. However, by intentionally creating a multi-spiral structure with partially overlapping tracks in a designated area of the optical disc apart from the actual content track(s), a unique, measurable fingerprint may be provided for the optical disc that is very difficult to clone. As mentioned above, the difficulty in replicating the multi-spiral structure stems from the physical limitations of the LBR used to form the spiral data tracks. Specifically, the positioning repeatability of the recording head of the LBR is such that repeating a duplicate spiral data track with exactly the same initial alignment, even under the same conditions that existed when forming the first spiral data track, is highly improbable. As a result, the specific process and the specific parameters used to create the disclosed stochastic anti-piracy feature may be freely shared with, or otherwise publicly accessible to, unauthorized manufacturers without the risk of allowing illegal disc pirating. An authorized manufacturer of the optical disc need only maintain the secrecy of a private key used to encrypt the verification parameters for verifying the multi-spiral structure, which is much easier to keep private than the process or algorithms used to create an anti-piracy feature.

The techniques and systems described herein may be implemented in a number of ways. Example implementations are provided below with reference to the following figures.

Example System Architecture

FIG. 1 illustrates an example system architecture 100 for manufacturing, distributing, and playing optical discs, such as the optical disc 102. The optical disc 102 may include a stochastic anti-piracy feature 104 created on the optical disc 102 during a manufacturing process. These copy-protected discs may be distributed to consumers, such as the consumer 106, and subsequently authorized for playback on one or more optical disc reading devices 108(1), 108(2), . . . , 108(N) (collectively "108"). The architecture 100 is merely one example architecture to implement the techniques described herein such that the techniques described herein are not limited to performance within the architecture 100 of FIG. 1.

The architecture 100 may include an optical disc maker 110 (sometimes referred to as a "manufacturer" 110), which may represent any suitable entity that owns or operates a disc manufacturing factory where optical discs, such as the optical disc 102, are produced. The optical disc maker 110 may receive software or content 112 from a content provider 114 (e.g., a video game developer) that is to be recorded on the optical disc 102. The software/content 112 developed by the content provider 114 and provided to the optical disc maker 110 represents the content 112 that is to be protected from illegal reproduction by the techniques and systems described herein. The content 112 may be data content, media content (e.g., video games), or any other suitable content. In some embodiments, the optical disc maker 110 and the content provider 114 are one and the same entity, whereas, in other embodiments, the content provider 114 is a separate entity from that of the optical disc maker 110.

The optical disc maker 110 may carry out a disc manufacturing process that may involve any one or more of: recording the received software/content onto a master disc, pressing the optical discs, such as the optical disc 102, forming reflective films on the optical discs, and/or laminating discs together (e.g., for multi-layer discs), among other processing steps that may be carried out to manufacture a completed optical disc 102.

In addition to the aforementioned manufacturing operations, the optical disc maker 110 may further add the stochastic anti-piracy feature 104 (sometimes referred to herein as a "marking," "fingerprint," "structure," or "pattern") to the optical disc 102 using a writing mechanism, such as a laser 116. The stochastic anti-piracy feature 104 may be added to a master disc that is then used to press multiple other optical discs for mass production. The stochastic anti-piracy feature 104 is a physical feature, or structure, formed on the optical disc 102. As described herein, the stochastic anti-piracy feature 104 may take the form of a structure having multiple spiral data tracks that are partially overlapping and partially interleaving each other. In this sense, the stochastic anti-piracy feature 104 is sometimes used interchangeably herein with the term "multi-spiral structure" 104 because the stochastic anti-piracy feature 104 may be comprised of the multiple spiral data tracks that are partially overlapping and partially interleaving. In some embodiments, the multi-spiral structure 104 is comprised of two spiral data tracks, and in this scenario, the anti-piracy feature 104 may be referred to as a "dual-spiral structure" 104.

After creating the multi-spiral structure 104 on the optical disc 102, the optical disc maker 110 may analyze the multi-spiral structure 104 using a reading mechanism, such as an optical pickup 118, to determine characteristics of the multi-spiral structure 104 that may be measured for obtaining verification parameters 120 of the multi-spiral structure 104. The optical disc maker 110 may encrypt the verification parameters 120 by cryptographically signing the verification parameters 120 obtained from the analysis of the multi-spiral structure 104. In some embodiments, the encryption may include the use of a private key of a public key encryption function. The owner of the private key may be considered a trusted authority or authorized manufacturer such that the use of the private key to cryptographically sign the verification parameters 120 indicates the authenticity of the encrypted verification parameters 120. That is, processing the verification parameters 120 with the private key may produce a digital signature that is associated with the trusted authority. In other embodiments, a symmetric key encryption function may be utilized for the encryption, or any other suitable cryptography technique to encrypt the verification parameters 120 and other anti-piracy related information.

In some embodiments, the encrypted verification parameters 120 may be added to the optical disc 102 at a predetermined location. The predetermined location where the encrypted verification parameters 120 are added may comprise a burst cutting area (BCA) of the optical disc 102. If the optical disc 102 is a multi-layer disc (i.e., a disc having multiple (e.g., two) data layers bonded together), the predetermined location where the encrypted verification parameters 120 are added may comprise a second layer of the optical disc 102. In this scenario, a translucent metallic coating may be provided on the layer, L0, that is closest to the optical pickup unit (OPU) when the optical disc 102 is placed in an optical disc drive, the translucent metallic coating allowing a laser beam of the OPU to pass through the closest layer, L0, and to focus on a deeper layer, such as a second layer, L1. Any other suitable location on the optical disc 102 may be utilized for storing the encrypted verification parameters 120 without departing from the basic characteristics of the system.

Additionally, or alternatively, the encrypted verification parameters 120 may be stored in a network-accessible storage location, such as a copy protection data store 122 accessible via a side channel separate from the optical disc 102 itself. For example, a networked storage server 124 may provide access to the verification parameters 120 stored in the copy protection data store 122 via a network 126. The network 126 represents any one or combination of multiple different types of networks, such as wide area networks (WANs) or local area networks (LANs) and including cable networks, the Internet, and wireless networks. Whether maintained on the optical disc 102 itself, or in a location accessible via a side channel, such as the copy protection data store 122, the encrypted verification parameters 120 may be persisted in a retrievable location such that an optical disc reading device 108 may access the verification parameters 120 at an appropriate time.

Once the multi-spiral structure 104 has been created and analyzed to obtain the verification parameters 120, one or more completed optical discs having the multi-spiral structure 104 may be provided to one or more distributors, such as the retail store 128. The retail store 128 may comprise a physical, brick-and-mortar store that offers optical disc media containing content, such as the content 112, for consumption. For example, the retail store 128 may offer video game discs for purchase by consumers, such as the consumer 106 who may physically visit the retail store 128 to purchase the optical disc 102. The retail store 128 may also represent an online retailer (electronic retailer (e-retailer)) offering optical media products for purchase online. In either case, the consumer 106 may purchase the optical disc 102 in store, or request that the optical disc 102 be delivered to a shipping address by a delivery vehicle, such as a delivery truck 130.

Once the consumer 106 has purchased the optical disc 102, the consumer 106 may consume the content 112 thereon by inserting the optical disc 102 into an optical disc reading device 108 that is configured to play back the content 112 on the optical disc 102 via an output device, such as a display and/or speakers. FIG. 1 shows example optical disc reading devices 108, including a game console 108(1) having an optical disc drive, a portable game player 108(2) having an optical disc drive, and an automobile 108(N) having an optical disc drive. As mentioned above, however, the optical disc reading devices 108 are not limited to those shown in FIG. 1.

Upon insertion of the optical disc 102 into an associated optical disc drive of the optical disc reading device 108, the optical disc reading device 108 may be configured to authenticate the optical disc 102 by retrieving/accessing and decrypting the encrypted verification parameters 120, such as by using a public key of a public/private key pair associate with a public key encryption function. When persisted on the optical disc 102 itself, the encrypted verification parameters 120 may be retrieved from the predetermined area, such as the BCA or a secondary layer of a multi-layer disc. When the encrypted verification parameters 120 are persisted on a medium that is separate from the optical disc 102, the optical disc reading device 108 may be configured to retrieve the encrypted verification parameters 120 via a side channel, such as over the network 122 by accessing the copy protection data store 122. For example, the gaming console 108(1) may be configured to receive and transmit data over the network 126, and may download the encrypted verification parameters 120 in order to authenticate the optical disc 102 that has been inserted into the game console's optical disc drive. In some embodiments, the game console 108(1) may be configured to periodically download verification parameters 120, which may take place at some time before the optical disc 102 is inserted into the optical drive of the game console 108(1). That way, the game console 108(1) may operate in an "offline mode" during disc authentication where the game console 108(1) is not connected to the network 126, yet the game console 108(1) is still able to authenticate the optical disc 102 using the previously downloaded verification parameters 120. In other embodiments, the optical disc reading device 108 may access the verification parameters 120 via a side channel in response to insertion of the optical disc 102 into the optical drive of the device 108 (i.e., real-time side channel parameter retrieval). The network-accessible data store 122 is just one illustrative example of a suitable side channel by which the encrypted verification parameters 120 may be retrieved, and it is to be appreciated that other suitable side channels may be utilized, such as a separate storage medium (e.g., a universal serial bus (USB) thumb drive) that the consumer 106 inserts into an appropriate drive of the reading device 108, and the like.

As will be described in more detail below, the optical disc reading device 108 may utilize custom firmware to verify the multi-spiral structure 104 on the optical disc 102 using decrypted verification parameters 120. If the multi-spiral structure 104 on the optical disc 102 does not match the measured result embodied in the verification parameters 120, the optical disc reading device 108 may refrain from authenticating the optical disc 102 by returning an error or otherwise rejecting the optical disc 102 for playback purposes. If, on the other hand, the multi-spiral structure 104 is verified using the verification parameters 120, the optical disc 102 may be authenticated for playback via the optical disc reading device 108.

Figure 2A:
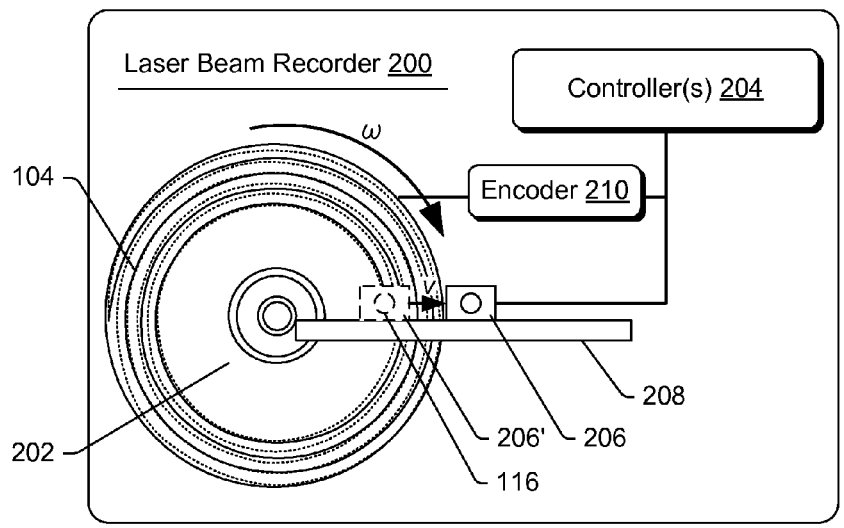
FIG. 2A illustrates an example laser beam recorder that may be utilized to form spiral data tracks on an optical disc as part of creating a stochastic anti-piracy feature.

FIG. 2A illustrates an example laser beam recorder (LBR) 200 that may be utilized to form one or more spiral data tracks on an optical disc, such as a master disc 202, as part of creating an example stochastic anti-piracy feature 104. The LBR 200 may also be utilized for forming one or more spiral data tracks corresponding to the main content 112 on the optical disc 102, such as video game content.

During a mastering process, a controller 204 of the LBR 200 may instruct a recording head 206 to move at a particular translational velocity (rate or speed), v, along a gantry 208 or a similar structure that enables translational movement of the recording head 206. In FIG. 2A, the recording head 206' represents the recording head 206 at a time in the past, while the recording head 206 in FIG. 2A represents the recording head 206 after translational movement from the position of the recording head 206' to a new position toward an outer diameter of the master disc 202. The controller 204 may also instruct an encoder 210 or a similar type of rotating mechanism to rotate the master disc 202 at a particular angular velocity (rate or speed), ω. As the recording head 206 moves along the gantry 208, the laser 116 (introduced in FIG. 1) forms pits and lands in a spiral pattern in order to encode data on the master disc 202 in a spiral data track. Suitable disc mastering processes are known to a person having ordinary skill in the art. One example technique for forming spiral data tracks on a master disc 202 is a photoresist mastering technique that involves exposing light-sensitive photoresist on the master disc 202 to a modulated beam of short-wavelength light that carries the data to be written to the master disc 202 in encoded form. Another technique for forming spiral data tracks on a master disc 202 is a dye-polymer mastering technique that involves focusing laser energy on a dye-polymer to vaporize the dye-polymer at the focused location, which results in a pit formed in the surface of the dye-polymer. It is to be appreciated that other disc mastering techniques may be utilized without departing from the basic characteristics of the system.

Through careful selection of the angular velocity, co, of the master disc 202 and the translational velocity, v, of the recording head 206, a data track having a spiral shape can be formed with particular parameters, including a track pitch and a length of the spiral data track. By writing one spiral data track having a first track pitch, and another spiral data track having a second track pitch that is different than the first track pitch, the multi-spiral structure 104 may be created. As noted above, the portions of the multi-spiral structure that have overlapping data tracks and the portions that have interleaved (non-overlapping) data tracks is unpredictable due to the deviation experienced in the initial alignment of the LBR 200.

Figures 2B, 2C:
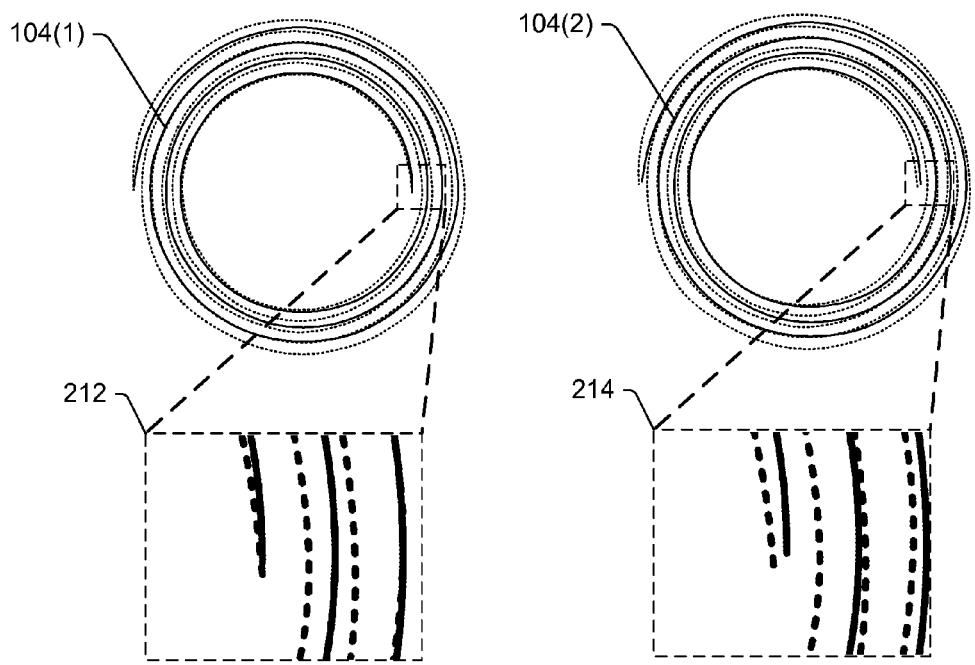
FIG. 2B illustrates an example multi-spiral structure comprising two spiral data tracks having different track pitches.
FIG. 2C illustrates another example multi-spiral structure comprising two spiral data tracks having the same respective track pitches as the spiral data tracks shown in FIG. 2B, but having different initial alignment due to the limitations of the laser beam recorder used to form the multi-spiral structures of FIGS. 2B and 2C.

This unpredictability is illustrated further in FIGS. 2B and 2C. FIGS. 2B and 2C represent two different multi-spiral structures 104(1) and 104(2) formed under the same conditions (i.e., having the same track pitch specifications), yet the positioning repeatability of the LBR 200 causes the initial alignment of the spiral data tracks that make up the structures 104(1) and 104(2) to vary between the structures 104(1) and 104(2). This is shown in more detail by way of the zoomed in portions 212 and 214 of FIGS. 2B and 2C, respectively, illustrating the variation in initial alignment of the spiral data tracks, notwithstanding the fact that the same relative track pitches were specified when forming the multi-spiral structures 104(1) and 104(2). Thus, FIGS. 2B and 2C illustrate the result of the limitation of using the LBR 200. This limitation of the LBR 200 is the main factor that causes a multi-spiral structure 104 formed by the LBR 200 to be stochastic (i.e., non-deterministic). For example, if the multi-spiral structure 104(1) was created by an authorized manufacturer, the multi-spiral structure 104(2) might represent an attempt by an unauthorized manufacturer to replicate the multi-spiral structure 104(1) of FIG. 2B. In this case, the attempt would have failed.

Figure 3:
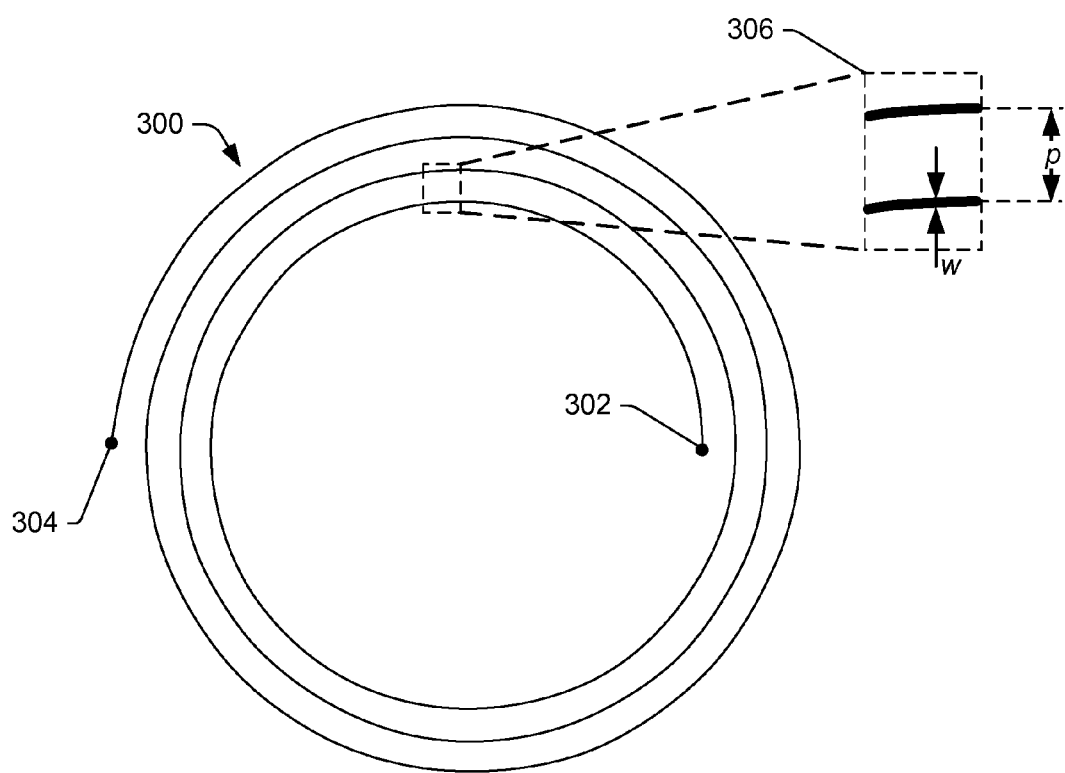
FIG. 3 is a diagram of an example spiral data track that may be formed on an optical disc to illustrate example parameters of a spiral data track.

FIG. 3 is a diagram of an example spiral data track 300 that may be formed on an optical disc 102. FIG. 3 further illustrates some example parameters of the spiral data track 300 including a start position 302 where the LBR 200 begins forming the spiral data track 300, an end position 304 where the LBR 200 stops forming the spiral data track 300, the track pitch, p, and the track width, w, as shown within the zoomed in view 306 of a portion of the spiral data track 300. As noted above with reference to FIG. 2A, the track pitch, p, is one example parameter of the spiral data track 300 that may be controlled by the LBR 200 through controlling the angular velocity, ω, of the master disc 202 and the translational velocity, v, of the recording head 206. The track pitch, p, is measured as the distance between successive loops of the spiral data track in a radial direction of the disc. For example, the track pitch, p, may be measured from the middle of one loop of the spiral data track to the middle of a successive loop of the spiral data track.

When forming a spiral data track for the main content 112 of the optical disc 102, it is often a goal to achieve the highest data density possible (i.e., the smallest track pitch, p) while avoiding any noise issues resulting from closely spaced track loops. Depending on the data storage format, the smallest achievable track pitch, p, may vary due to the differences in the wavelength of light used by the laser 116 for different optical disc formats. For example, for a CD format, a laser 116 emitting a wavelength of about 780 nanometers (nm) may be utilized to form a track having a track width, w, of about 600 nm and a track pitch, p, of about 1.6 micrometers (μm). On the other end of the spectrum, a Blu-ray laser 116 emitting a wavelength of about 405 nm may be utilized to form a track having a track width, w, of about 130 nm and a track pitch, p, of about 320 nm. For the main content 112, a track pitch, p, that is slightly larger than the track width, w, may be selected to allow for the highest possible data density while still reducing noise from the adjacent track loops.

Figure 4:
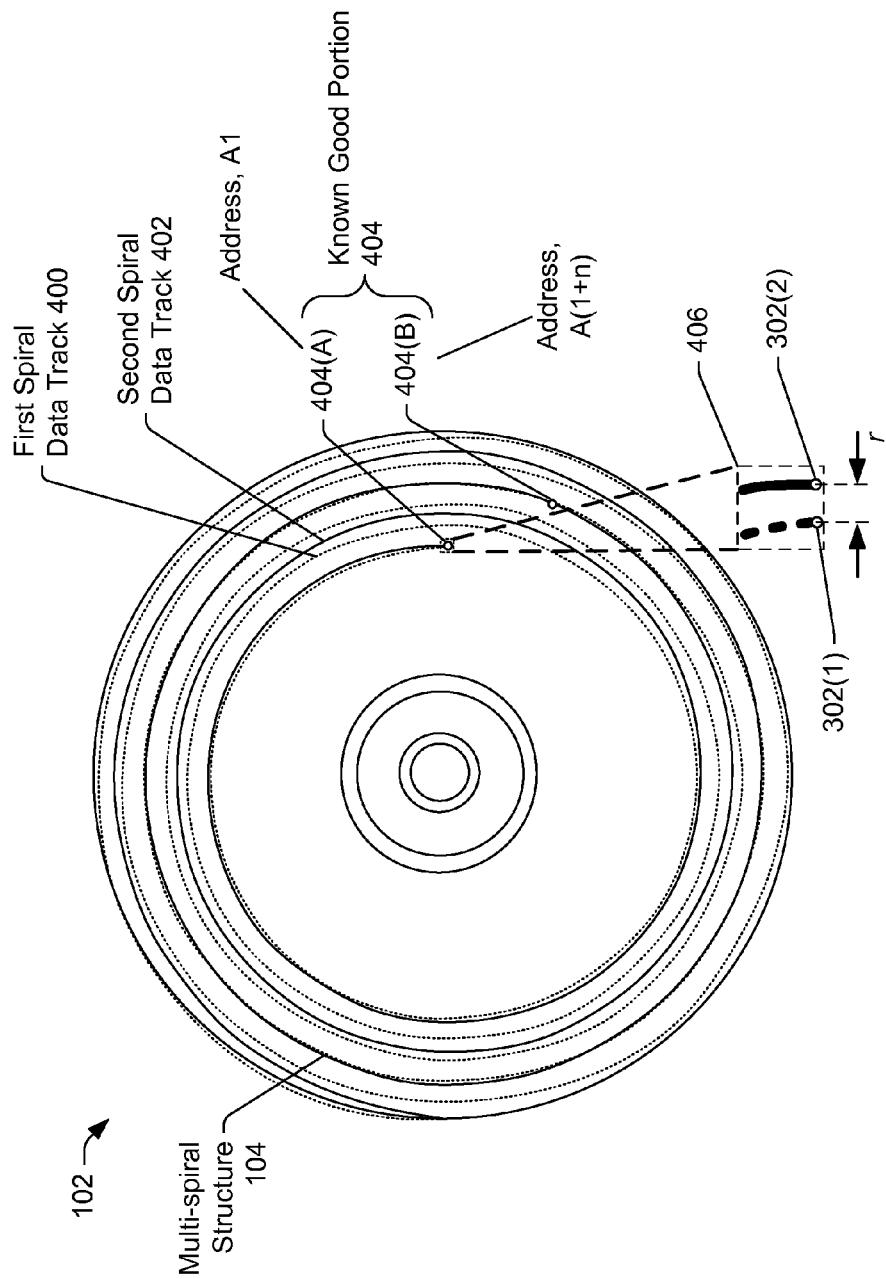
FIG. 4 illustrates an example optical disc having a multi-spiral structure.

FIG. 4 illustrates an example optical disc 102 having a multi-spiral structure 104. The optical disc 102 may represent the master disc 202 of FIG. 2A as it would appear after the creation of the multi-spiral structure 104, or the optical disc 102 may represent a stamped copy of the master disc 202 that is the optical disc medium to be distributed to consumers as a completed product. The multi-spiral structure 104 may be comprised of at least a first spiral data track 400 (dashed line) and a second spiral data track 402 (solid line). Thus, FIG. 4 is an example of a dual-spiral structure because two spiral data tracks 400, 402 make up the multi-spiral structure 104, although the multi-spiral structure 104 may be constituted of any number of multiple spiral data tracks. When creating the multi-spiral structure 104, the track pitch, p, of the first spiral data track 400 (i.e., first track pitch) may be set at a suitable value in order to achieve some level of interleaving with the second spiral data track 402 that is formed on the master disc 202 after the first spiral data track 400. Because data density is not a concern when creating the multi-spiral structure 104, the first track pitch of the first spiral data track 400 may be greater than a nominal track pitch, p, used for writing the main content 112 to the master disc 202. For example, the first track pitch of the first spiral data track 400 may be about 2.5 times the nominal track pitch used for recording the main content 112. In this example, for a Blu-ray optical disc storage format, the first track pitch for the first spiral data track 400 may be at least about 800 nm (i.e., 2.5×320 nm=800 nm). In this manner, the second spiral data track 402 may be partially interleaved with the first spiral data track 400 to create the multi-spiral structure 104 having turns or loops of the second spiral data track 402 interposed between successive turns or loops of the first spiral data track 400.

The second spiral data track 402 may be formed by the LBR 200 on the master disc 202 after the formation of the first spiral data track 400. A second track pitch of the second spiral data track 402 may be chosen to be different from the first track pitch of the first spiral data track 400 so that a partially overlapping, and partially interleaving, pattern may be achieved for the multi-spiral structure 104. In one illustrative example, a percent difference between the first track pitch of the first spiral data track 400 and the second track pitch of the second spiral data track 402 may be at least about 3.5%. The percent difference between the two track pitches may be defined as a ratio of the difference between the two track pitches and the average of the two track pitches, shown as a percentage. In other words, the percent difference between the two track pitches can be defined as the difference between the two track pitches divided by the average of the two track pitches, shown as a percentage. Equation (1) is an example of the percent difference calculation:

$$\text{Percent Difference} = \frac{|p_1 - p_2|}{\left(\frac{p_1 + p_2}{2}\right)} \times 100\% \qquad \text{Eq. (1)}$$

Here, $p_1$ may represent the first track pitch of the first spiral data track 400, and $p_2$ may represent the second track pitch of the second spiral data track 402, or vice versa. Continuing with the previous example, the first track pitch of the first spiral data track 400 may be about 800 nm (or 2.5 times a nominal Blu-ray track pitch), and the second track pitch of the second spiral data track 402 may be about 832 nm (or 2.6 times a nominal track pitch for the main content 112 of a Blu-ray disc). The second track pitch may be greater than or less than the first track pitch. In this manner, the first spiral data track 400 may overlap with the second spiral data track 402 at certain portions of the multi-spiral structure 104, yet interleave with the second spiral data track 402 at other portions of the multi-spiral structure 104, as shown in FIG. 4. That is, in portions of the multi-spiral structure 104 where the two spiral data tracks are interleaved, two successive turns or loops of the first spiral data track 400 may be interrupted by a turn or loop of the second spiral data track 402 interposed between the successive turns of the first spiral data track 400.

The portion(s) of the multi-spiral structure 104 where the spiral data tracks 400 and 402 do not overlap (i.e., interleave with each other) may be considered a "known good portion(s)" or "a valid portion(s)" of the multi-spiral structure 104 because data may be read from the respective tracks 400 and 402 within the known good portion(s). By contrast, the data tracks 400 and 402 may be unreadable in the portions of the multi-spiral structure 104 where the data tracks 400 and 402 overlap with each other. An example of a known good portion is shown as the known good portion 404 in FIG. 4. The known good portion 404 is shown as a portion of the multi-spiral structure 104 beginning at a starting point 404(A), having a first address, A1, and spanning or traversing a distance along the spiral data tracks 400 and 402 to the ending point 404(B), having a second address A(1+n). Any suitable optical disc addressing scheme may be utilized to identify the starting point 404(A) and the ending point 404(B) with respective addresses to identify locations on the optical disc 102 where the known good portion 404 starts and stops. Although the addresses A1 and A(1+n) are denoted generically with an "A" designation, these addresses may take any suitable form, including binary coded addresses, and the addresses may include information as to blocks or sectors, or any other suitable location information that corresponds to a location on the optical disc 102. Notably, the spiral data tracks 400 and 402 do not overlap each other within the known good portion 404. Instead, the spiral data tracks 400 and 402 are interleaved within the known good portion 404.

If the LBR 200 had perfectly precise positioning repeatability, the recording head 206 of the LBR 200 could locate the start position 302(1) of the first spiral data track 400 to begin the second spiral data track 402 from the exact same start position 302(1), and one could then predict—based on parameters like the respective track pitches of the two spiral data tracks 400 and 402—the resulting pattern of the multi-spiral structure 104 in terms of the known good portions 404 and the overlapping portions of the multi-spiral structure 104. In practice, however, the positioning repeatability of the recording head 206 of the LBR 200 is such that the start position 302(2) of the second spiral data track 402 may be radially shifted by a distance, r, from the start position 302(1) of the first spiral data track 400, as shown in the zoomed-in view 406 of FIG. 4. For example, the radial spacing, r, may be on the order of a few (e.g., 3) micrometers (microns). In this sense, the start position 302(1) of the first spiral data track 400 may be said to be "proximate to" the start position 302(2) of the second spiral data track 402. In some embodiments, the relative radial spacing, r, between the start position 302(1) and the start position 302(2) may be no greater than about 5 microns for the start position 302(1) to be considered as "proximate to" the start position 302(2). The alignment limitation of the LBR 200 is enough to make the multi-spiral structure 104 a non-deterministic (or stochastic) physical feature such that one may not reliably predict where the known good portions, such as the known good portion 404, will reside within the multi-spiral structure 104, let alone the length of a continuous portion of either or both of the spiral data tracks 400 and 402 that are contained within the known good portion 404. As a consequence, the probability of replicating the multi-spiral structure 104 is low enough to ensure that an unauthorized entity would be forced to make an inordinately high number of replication attempts to even have a chance at creating the exact same multi-spiral structure 104.

The starting point 404(A) of the known good portion may, in some instances, coincide with the start positions 302(1) and 302(2) of the multiple spiral data tracks 400 and 402 when the tracks are readable at their start positions 302(1) and 302(2). Alternatively, a first known good portion of the multi-spiral structure 104 may have a starting point 404(A) that does not coincide with the start positions 302(1) and 302(2), such as after a portion of the multi-spiral structure 104 having overlapping spiral data tracks where the spiral data tracks begin to diverge and hence become readable by an optical pickup unit.

The example of FIG. 4 shows the multi-spiral structure 104 added to a designated area of the optical disc 102 that is at the outer periphery of the optical disc 102. However, it is to be appreciated that the designated area containing the multi-spiral structure 104 may be any suitable area on the optical disc 102, including the inner area closest to the center of the optical disc 102, the outer area of the optical disc 102 shown in FIG. 4, or anywhere in between. So long as one or more areas are allocated on the optical disc 102 for recording the main content 112, any other available area of the optical disc 102 may be utilized for adding the multi-spiral structure 104 to the optical disc 102.

Figure 5:
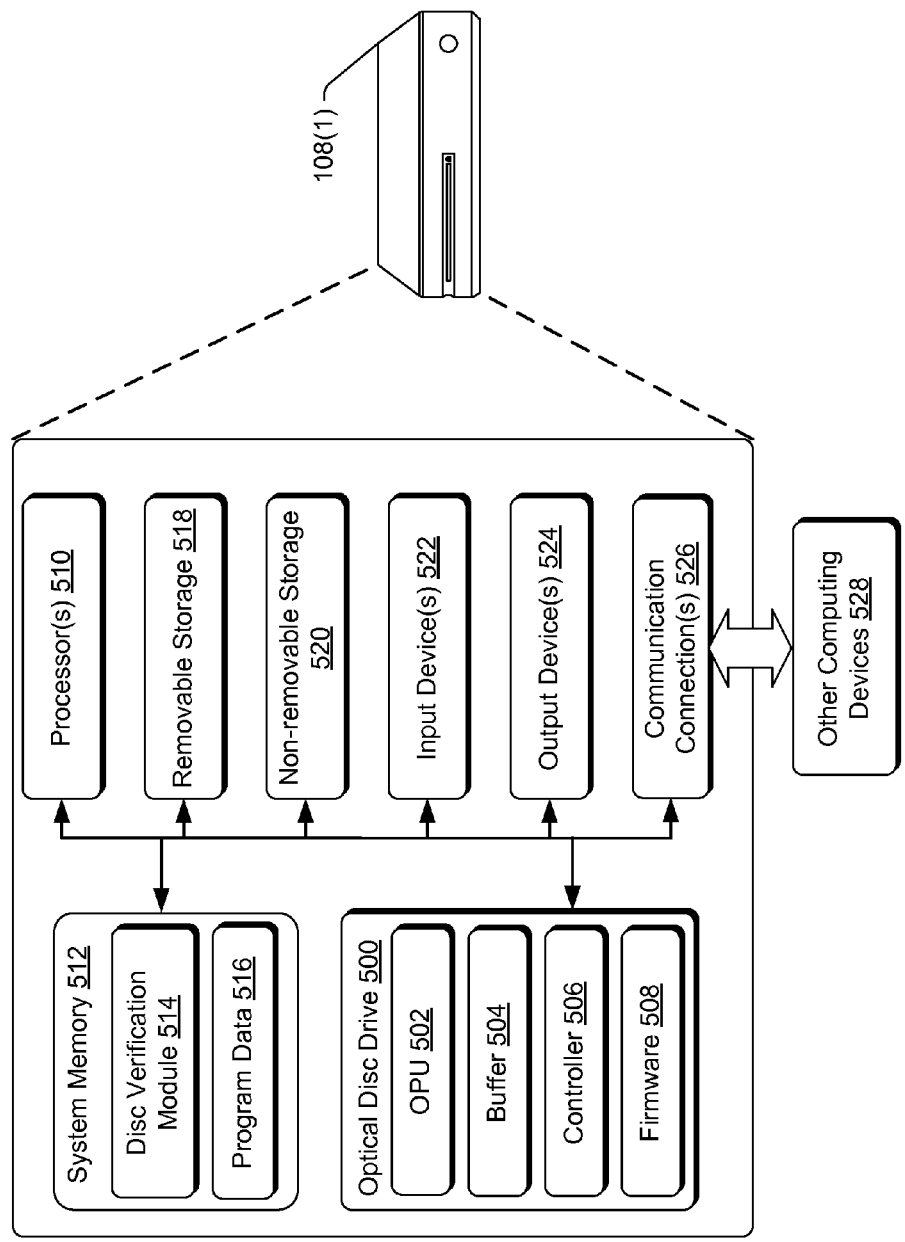
FIG. 5 illustrates an example optical disc reading device.

FIG. 5 illustrates an example optical disc reading device 108(1) in the form of a game console. It is to be appreciated that the components illustrated in FIG. 5 may be implemented in any suitable optical disc reading device, including, without limitation, a personal computer, a tablet computer, a laptop computer, a netbook computer, a television, a set-top box, a game console, a portable game player, a vehicle (e.g., car, plane, etc.), and so on.

The optical disc reading device 108(1) may be equipped with an optical disc drive 500. The optical disc drive 500 may include an optical pickup unit (OPU) 502 (sometimes referred to as an "optical pickup" 502) to read data from the spiral data tracks of an optical disc 102 that has been inserted into the optical disc drive 500. The optical disc reading device 108(1) may also include a buffer 504 to store information retrieved from the optical disc 102 by the OPU 502. When the optical disc 102 is writable/recordable, the buffer 504 may be configured to store information to be recorded/written to the optical disc 102. The buffer 504 may be comprised of volatile memory.

The optical disc drive 500 may further include a controller 506 to receive read and/or write commands from the device 108(1) and to retrieve data from the optical disc 102 within the drive 500, decode and correct the data, if necessary, and store the data in the buffer 504 for further processing by the device 108(1). The controller 506 may be configured to execute firmware 508 to carry out operations of the optical disc drive 500 pertaining to authentication of an optical disc 102 provided therein. The firmware 508 may be non-volatile memory, such as flash memory, electrically erasable programmable read only memory (EEPROM), and the like. The optical disc drive 500 may be integrated into the optical disc reading device 108(1) or may be a peripheral drive 500 connected to the device 108(1) via a suitable interface, such as an integrated drive electronics (IDE) interface, a small computer system interface (SCSI interface), a serial advanced technology attachment (SATA) interface, or any other suitable interface.

The optical disc reading device 108(1) may be equipped with one or more processors 510 and system memory 512. Depending on the exact configuration and type of optical disc reading device 108(1), the system memory 512 may be volatile (e.g., random access memory (RAM)), non-volatile (e.g., read only memory (ROM), flash memory, etc.), or some combination of the two. The system memory 512 may include, without limitation, a disc verification module 514 and program data 516 accessible to the processor(s) 510. The disc verification module 514 may be configured to carry out at least a portion of the operations involved in a disc authentication process, such as checking or validating a signature associated with encrypted verification parameters 120 for a particular optical disc 102 to be authenticated, among other operations.

The optical disc reading device 108(1) may also include additional data storage devices (removable and/or non-removable) such as, for example, magnetic discs, optical discs, or tape. Such additional storage is illustrated in FIG. 5 by removable storage 518 and non-removable storage 520.

Computer-readable media, as used herein, may include, at least, two types of computer-readable media, namely computer storage media and communication media. Computer storage media may include volatile and nonvolatile, removable and non-removable media implemented in any method or technology for storage of information, such as computer readable instructions, data structures, program modules, or other data. The system memory 512, firmware 508, removable storage 518, and non-removable storage 520 are all examples of computer storage media. Computer storage media includes, but is not limited to, RAM, ROM, EEPROM, flash memory or other memory technology, CD read-only memory (CD-ROM), DVD, HD DVD, Blu-ray, or other optical storage, magnetic cassettes, magnetic tape, magnetic disc storage or other magnetic storage devices, or any other non-transmission medium that can be used to store the desired information and which can be accessed by the optical disc reading device 108(1). Any such computer storage media may be part of the device 108(1).

In some embodiments, any or all of the system memory 512, firmware 508, removable storage 518, and non-removable storage 520 may store programming instructions, data structures, program modules and other data, which, when executed by the processor(s) 510 and/or controller 506, implement some or all of the processes described herein.

In contrast, communication media may embody computer-readable instructions, data structures, program modules, or other data in a modulated data signal, such as a carrier wave, or other transmission mechanism. As defined herein, computer storage media does not include communication media.

The optical disc reading device 108(1) may also include one or more input devices 522 such as a keyboard, pointing devices (e.g., mouse, touch pad, joystick, etc.), a pen, stylus, or wand, remote controller, a touch screen, a camera (e.g., 3D sensor), a microphone, etc., through which a user may enter commands and information into the optical disc reading device 108(1). Although the input device(s) 522 are shown in FIG. 5 to be within optical disc reading device 108(1), it is to be appreciated that the input device(s) 522 may be physically embedded within the optical disc reading device 108(1) (e.g., a touch screen), or the input device(s) 522 may be peripheral devices that are removably coupled to the optical disc reading device 108(1) through either a wired or wireless connection (e.g., a peripheral camera-based input device, remote controller, etc.). Accordingly, the input device(s) 522 may be coupled to the processor(s) 510 through a wired connection (e.g., a universal serial bus (USB) interface), or a wireless user input interface such as WiFi or Bluetooth®.

The optical disc reading device 108(1) may also include output device(s) 524, such as a display, one or more speakers, a printer, or any other suitable output device coupled communicatively to the processor(s) 510. The output device(s) 524 may generally be configured to provide output to a user of the optical disc reading device 108(1). In some embodiments, the output device(s) 524 may be integrated into the optical disc reading device 108(1) (e.g., an embedded display), or provided externally as a peripheral output device 524 (e.g., a peripheral display).

The optical disc reading device 108(1) may operate in a networked environment and, as such, the optical disc reading device 108(1) may further include communication connections 526 that allow the device 108(1) to communicate with the other computing devices 528, such the networked storage server 124 providing access to remotely stored verification parameters 120 for authenticating an optical disc 102. The communication connections 526 are usable to transmit and/or receive data.

Example Processes

FIGS. 6, 7, 8, and 9 illustrate processes as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
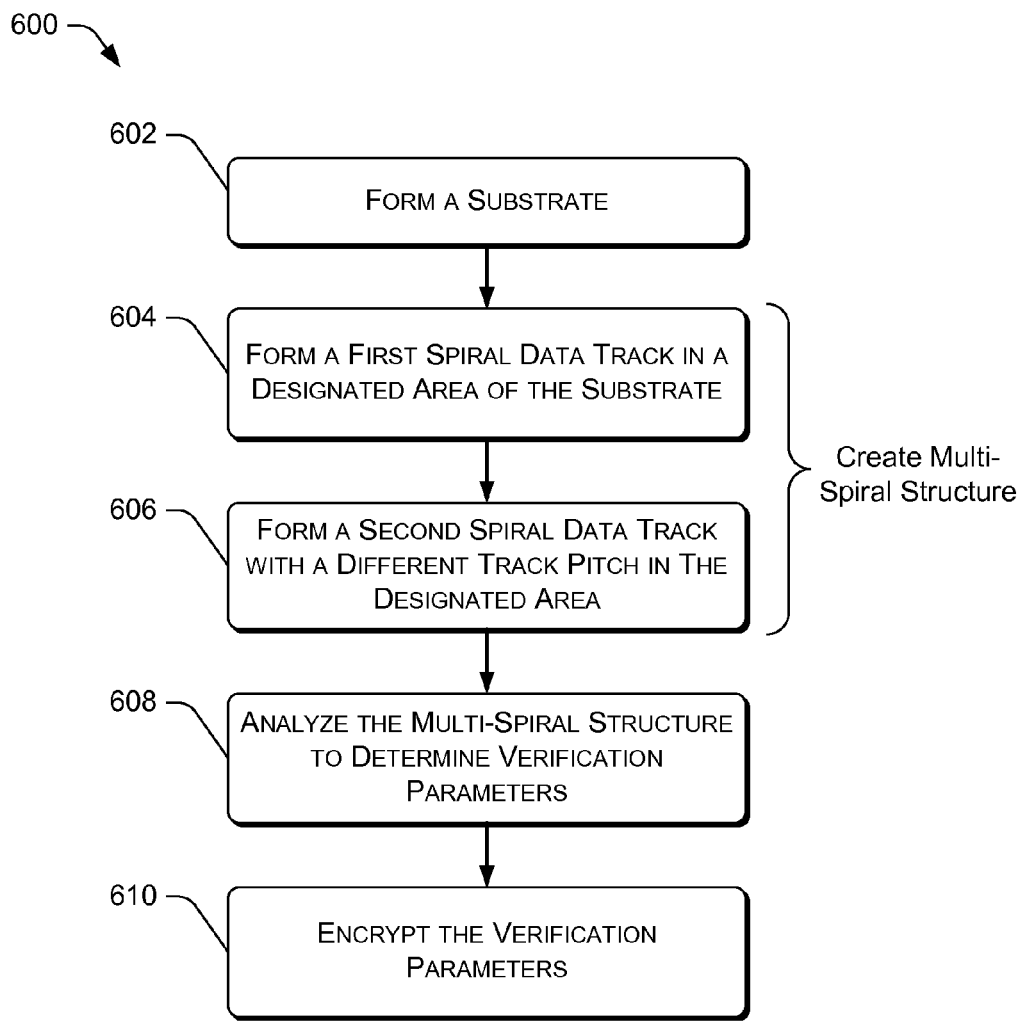
FIG. 6 is a flow diagram of an illustrative process for manufacturing an optical disc.

FIG. 6 is a flow diagram of an illustrative process 600 for manufacturing an optical disc. For discussion purposes, the process 600 is described with reference to the architecture 100 of FIG. 1 and the LBR 200 of FIG. 2A. Particular reference is made to the optical disc maker 110 and the components associated with the optical disc maker 110.

At 602, the optical disc maker 110, may form a substrate that is to be used for a master disc, such as the master disc 202 of FIG. 2A. The substrate may be comprised of glass or another suitable master disc material.

At 604, the LBR 200, via the recording head 206, may form, in a designated area of the substrate, a first spiral data track 400 having a first track pitch, $p_1$. As noted above, in some embodiments, the first track pitch of the first spiral data track 400 may be about 2.5 times a nominal track pitch used for recording a spiral data track of the main content 112 to be stored on the optical disc 102. In a Blu-ray disc storage format, the first track pitch of the first spiral data track 400 may be about 800 nm. The first spiral data track 400 also has a start position within the designated area, such as the start position 302(1) shown in FIG. 4, as well as an end position within the designated area; a general end position 304 of a spiral data track 300 is shown in FIG. 3. As noted above, the designated area may be any available area on the optical disc 102 apart from an area(s) allocated for the main content 112. For example, the designated area may be at the outer periphery of the optical disc 102.

At 606, the recording head 206, may form, in the same designated area of the substrate, a second spiral data track 402 having a second track pitch, $p_2$. As noted above, the second track pitch of the second spiral data track 402 may vary slightly from the first track pitch of the first spiral data track 400 to create a multi-spiral structure 104 with a pattern of partially overlapping, and partially interleaving, spiral data tracks. For example, the second track pitch may be about 2.6 times the nominal track pitch used for recording the spiral data track of the main content 112 of the optical disc 102. In the case of Blu-ray disc storage format, the second track pitch of the second spiral data track 402 may be about 832 nm, for example. The second spiral data track formed at 606 also has a start position within the designated area, such as the start position 302(2) shown in FIG. 4, as well as an end position within the designated area. As noted above, due to the physical limitations of the LBR 200 with respect to the positioning repeatability of the recording head 206, the start position 302(2) of the second spiral data track 402 is likely to be shifted by a radial distance, r, from the start position 302(1) of the first spiral data track 400, making the resulting multi-spiral structure 104 stochastic in nature and very difficult to clone.

At 608, an optical pickup 118 may be used to analyze the multi-spiral structure 104 that was created by steps 604 and 606. Particularly, the optical pickup 118 may be used to find start and end addresses of valid portions (i.e., portions with readable data tracks) of the multi-spiral structure 104, and those valid portions may be designated as known good portions, such as the known good portion 404 of FIG. 4. After step 608, information has been collected regarding the characteristics of the multi-spiral structure 104. For example information regarding the beginning and the end of individual known good portions in the multi-spiral structure may be determined from the analysis at 608 so that the number and extent of the known good portions may be identified. This information may be persisted in the form of verification parameters 120, which may be used to verify the multi-spiral structure 104 during a disc authentication process.

At 610, the verification parameters 120 may be encrypted, such as by cryptographically signing the verification parameters 120 using a private key of a public key encryption function. Table 1 includes, without limitation, some exemplary data that may be encrypted at step 610, including some example verification parameters 120 that may be determined from the analysis at 608.

TABLE 1

Media ID 1597
Anti-Piracy Feature Dual Spiral
Known Good Portions (KGPs):

| KGP# | Start Address | End Address | Length |
|---|---|---|---|
| KGP(1) | A5 | A15 | D1 |
| KGP(2) | A29 | A35 | D2 |
| ... | ... | ... | ... |
| KGP(N) | A106 | A124 | D3 |

In the example of Table 1, the example verification parameters 120 include the start address, end address, and length of each known good portion (KGP) of the multi-spiral structure 104 that was added to the optical disc 102 having media identifier (ID) 1597. In some embodiments, the list of known good portions of Table 1 may correspond to a single multi-spiral structure 104. However, it is to be appreciated that a particular optical disc 102 may have more than one multi-spiral structure 104 for added security, in which case, each multi-spiral structure 104 on the optical disc 102 may have associated verification parameters 120, such as those shown in Table 1. In other words, steps 604-608 of the process 600 may be repeated or iterated in other designated areas of the substrate to create and measure a plurality of multi-spiral structures, which further reduces the chance that an unauthorized manufacturer can successfully replicate the plurality of multi-spiral structures 104 on a single optical disc 102. It is also to be appreciated that the format and data structure of Table 1 is merely exemplary, and the verification parameters 120 determined from the analysis at step 608 may be arranged and stored in any suitable data structure.

In some embodiments, the encrypted verification parameters 120 resulting from step 610 may be added to an optical disc 102. For example, the optical disc maker 110 may add the encrypted verification parameters 120 to the plurality of optical discs that are replicated from the master disc 202. The encrypted verification parameters 120 may be added to a predetermined area of the optical disc 102, such as the BCA of the optical disc 102, a second layer of a dual-layer optical disc 102, or another suitable location on the optical disc 102. Alternatively, the encrypted verification parameters 120 may be persisted in any suitable location that is separate from the optical disc 102 and still accessible to the optical disc reading device 108 via a side channel. For example, the encrypted verification parameters 120 may be persisted in a network-accessible storage location, such as the copy protection data store 122 of FIG. 1.

The result of the process 600 is the creation of one or more multi-spiral structures 104 on a master disc 202 that may be reproduced on replicated optical discs 102 for end consumers 106. The multi-spiral structure 104 is very difficult to duplicate because of the stochastic (i.e., non-deterministic) nature of the multi-spiral structure 104 stemming from the physical limitations (i.e., positioning repeatability) of the equipment used to form the multi-spiral structure. So long as the information used to encrypt the verification parameters 120, such as a private key of a public key encryption function, remains secret, an unauthorized entity is not able to properly sign the multi-spiral structures they create on an optical disc in an attempt to make a pirated copy of the authentic disc 102.

Figure 7:
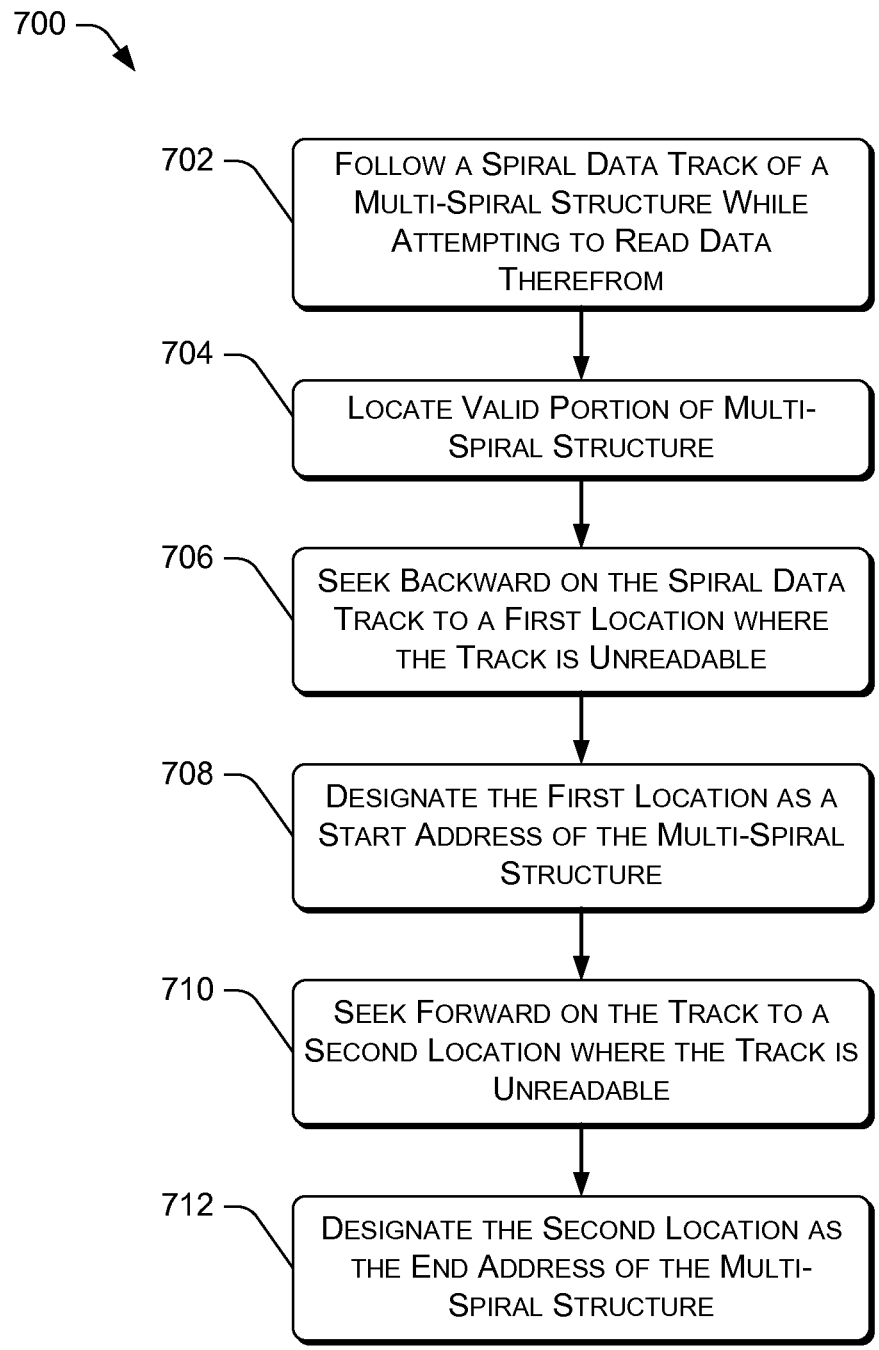
FIG. 7 is a flow diagram of an illustrative process for analyzing a multi-spiral structure to determine verification parameters for verifying the multi-spiral structure.

FIG. 7 is a flow diagram of an illustrative process 700 for analyzing a multi-spiral structure 104 to determine verification parameters 120 for verifying the multi-spiral structure 104. FIG. 7 may be considered a sub-process of step 608 of the process 600 in FIG. 6. For discussion purposes, the process 700 is described with reference to the architecture 100 of FIG. 1, and particularly the optical disc maker 110 including the optical pickup 118 utilized to determine the verification parameters 120.

At 702, the optical disc maker 110 may utilize an optical pickup 118 to follow one of the tracks of a multi-spiral structure 104 on an optical disc 102 while attempting to read data from the track. For instance, the optical pickup 118 may acquire a tracking lock on the first spiral data track 400 or the second spiral data track 402 at or near the start position 302 of the locked track. At any point along the spiral data track, if the optical pickup 118 is able to read data from the spiral data track, it can be determined that the two or more spiral data tracks (e.g., the first and second spiral data tracks 400 and 402) of the multi-spiral structure 104 do not overlap at the portion where the track is readable.

Accordingly, at 704, a valid portion of the multi-spiral structure 104 may be located or identified based on data being readable from the spiral data track at the current position of the optical pickup 118. At 706, and in response to locating the valid portion of the multi-spiral structure 104, the optical pickup 118 may seek backward along the spiral data track until the optical pickup 118 reaches a first location where the data is no longer readable from the spiral data track, indicating that the multiple spiral data tracks of the multi-spiral structure 104 overlap at the first location. This first location may mark the beginning (or a starting point 404(A)) of a known good portion 404 of the multi-spiral structure 104, and as such, at 708, the first location may be designated as a start address of the multi-spiral structure 104, as illustrated in FIG. 4 by the start address, A1.

At 710, the optical pickup 118 may seek forward along the spiral data track until the optical pickup 118 reaches a second location where the data is no longer readable from the spiral data track, again indicating that the multiple spiral data tracks of the multi-spiral structure 104 overlap at the second location as well. The second location may mark the end (or an ending point 404(B)) of the known good portion 404 of the multi-spiral structure 104, and as such, at 712, the second location may be designated as an end address of the multi-spiral structure 104, as illustrated in FIG. 4 by the end address, A(1+n). In some embodiments, margins of error are added to the starting point 404(A) and the ending point 404(B) to obtain the start address, A1, and the end address, A(1+n), in order to obtain a "guaranteed known good" portion 404.

In this manner, the process 700 may be utilized to measure the multi-spiral structure 104 to identify the characteristics (e.g., overlapping tracks, length of valid areas, etc.) of the pattern formed by the spiral data tracks 400 and 402 of the multi-spiral structure 104. These characteristics may be analyzed to determine the verification parameters 120, such as the start address, A1, of the known good portion 404, the end address, A(1+n), of the known good portion 404, a length of the known good portion 404, and/or any other suitable verification parameters 120 derivable from the identified characteristics. It is to be appreciated that the process 700 may be iterated for any number of valid portions that are present within a multi-spiral structure 104 so that verification parameters 120 associated with multiple known good portions of a multi-spiral structure may be determined.

Figure 8:
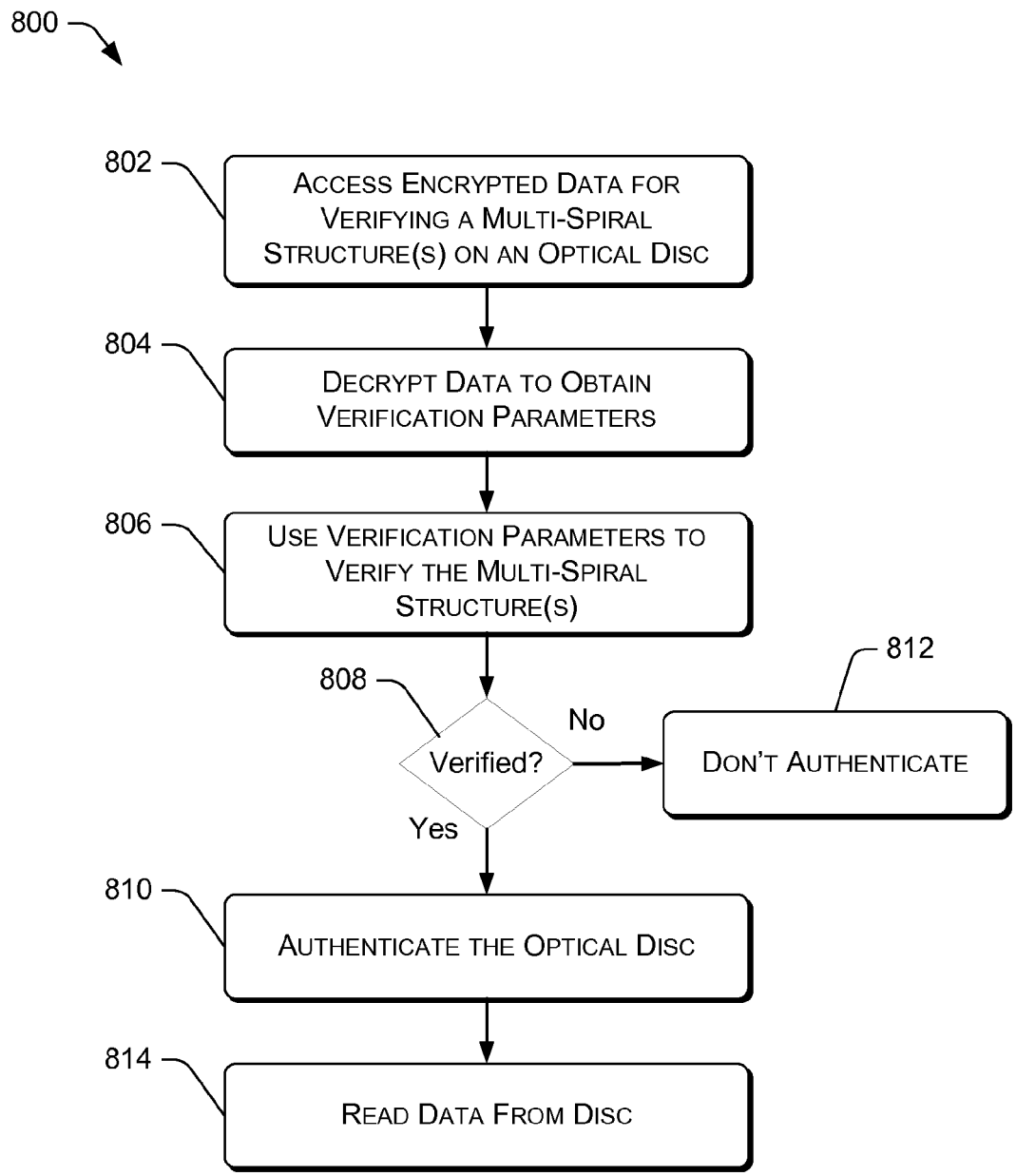
FIG. 8 is a flow diagram of an illustrative process for authenticating an optical disc based on a stochastic anti-piracy feature added to the optical disc.

FIG. 8 is a flow diagram of an illustrative process 800 for authenticating an optical disc 102 based on a stochastic anti-piracy feature (the multi-spiral structure 104) added to the optical disc 102. For discussion purposes, the process 800 is described with reference to the architecture 100 of FIG. 1 and the optical disc reading device 108(1) of FIG. 5. Particular reference is made to the optical disc maker drive 500 and the components associated with the optical disc drive 500.

A consumer 106 may insert an optical disc 102 into an optical disc drive 500 of an optical disc reading device 108, such as a game console so that the device 108 can playback the optical disc 102 by outputting the main content 112 thereon. As such, the process 800 may be used to authenticate the disc 102 for playback. In some embodiments, the process 800 may involve an initial step of detecting whether the optical disc 102 is a particular type of optical disc 102, such as a game disc when the optical disc reading device 108 is a game console. The optical disc drive 500 may read a particular sector of the optical disc 102 containing information that tells the device 108 that the optical disc 102 is a particular type of disc (e.g., a game disc). If it is not an appropriate type of disc, the optical disc 102 may be considered unplayable, and the optical disc drive 500 may eject the optical disc 102. Otherwise, the process 800 may include the following steps.

At 802, the optical disc drive 500 or another suitable component (e.g., the disc verification module 514 of the optical disc reading device 108), may access encrypted data for verifying a multi-spiral structure 104 on a portion of an optical disc 102. The encrypted data may include the verification parameters 120 needed to verify the multi-spiral structure 104, such as the start address(es), end address(es), and/or length(s) of one or more known good portions 404 of the multi-spiral structure 104. The accessing at 802 may involve accessing a predetermined portion of the optical disc 102 by the OPU 502 of the optical disc drive 500, such as the BCA of the optical disc 102, or a second layer of a dual-layer optical disc 102. Alternatively, the accessing at 802 may involve accessing the encrypted data via a side channel, such as the network 126.

At 804, the encrypted data may be decrypted to obtain the verification parameters 120 that are used to verify the multi-spiral structure 104 on the optical disc 102. The optical disc reading device 108 may utilize a public key of a public key encryption function to decrypt the data. In some embodiments, the signature associated with the encrypted data may be authenticated to verify that it was signed by a trusted authority. The decrypted data may take the form of Table 1, above, where the verification parameters 120 may be extracted from the signed data.

At 806, the verification parameters 120 may be used to verify the multi-spiral structure 104. In doing so, the optical disc reading device 108 or another suitable device verifies that the decrypted data matches what is actually on the optical disc 102; namely the multi-spiral structure 104. Verifying the multi-spiral structure 104 may include verifying that the characteristics of the multi-spiral structure 104 match the verification parameters 120. Such verification may further include identifying a known good portion 404 (valid or readable portion) of the multi-spiral structure 104. Identifying a known good portion 404 may include verifying that a first and/or second spiral data track are readable within the known good portion 404. Verifying that the first and/or second spiral data track are readable within the known good portion 404 may include seeking to a first address specified in the verification parameters 120 to verify that the known good portion 404 is present between the first address and a second address of the known good portion 404. A more detailed process of verifying the multi-spiral structure 104 will be discussed below with reference to FIG. 9.

At 808, a determination is made as to whether the multi-spiral structure 104 matches the decrypted data (i.e., that the multi-spiral structure 104 is the anti-piracy feature that the trusted authority says it should be). It is to be appreciated that the determination at 808 may be performed by any suitable component of the optical disc reading device 108 and/or another suitable device separate from the optical disc reading device 108. That is, the actual measurement of the characteristics of the multi-spiral structure 104 may be performed by the optical disc drive 500 via the OPU 502 and the firmware 508, but the determination of whether the characteristics correspond to (match) the verification parameters 120 to verify the characteristics of the multi-spiral structure 104 may be performed by any suitable component of the architecture 100. For example, the measurement result of the characteristics obtained by the optical disc drive 500 may be sent to another component of the optical disc reading device 108 (e.g., the disc verification module 514) so that verification of the characteristics is performed on the optical disc reading device 108 by a component other than the optical disc drive 500. In another example, the measurement result may be sent over a trusted communication path/channel to a remote server, such as the networked storage server 124, or a different remote computing resource, to verify the characteristics and authenticate the optical disc 102 remotely from the optical disc reading device 108. Many variations are possible as to which components, or combination of components, (between both on the device 108 and remote servers, such as the server 124) perform actions pertaining to the measurement of the characteristics of the multi-spiral structure 104, and the verification of those characteristics. Accordingly, the steps of the process 800 are not limited to performance by any particular example component described herein.

If the multi-spiral structure 104 is verified at 808, the optical disc may be authenticated for playback at 810. Otherwise, if the multi-spiral structure 104 is not verified at 808 (e.g., it is a fraudulently created multi-spiral structure, the optical disc 102 does not include a multi-spiral structure, etc.), the optical disc reading device 108 may refrain from authenticating the optical disc 102 for playback at 812. Step 812 may include outputting an error message via the output device(s) 524 of the optical disc reading device 108, ejecting the optical disc 102 from the optical disc drive 500, or otherwise rejecting the optical disc 102 in regards to playback.

If the optical disc 102 is authenticated for playback at 810, data may be read from the disc 102 at 814. For example, media content 112, such as a video game, may be read from the optical disc 102 and played back via the output device(s) 524 of the optical disc reading device 108.

The entire process 800 may take one or two seconds to execute, depending on the number of multi-spiral structures 104 present on the optical disc 102. It is recognized that, while a higher number of multi-spiral structures 104 on a given disc 102 may lead to increased security, there usability may be sacrificed for higher security in that it may take longer to verify a higher number of multi-spiral structures 104 than it would to verify a single multi-spiral structure 104.

In some embodiments, the authentication at 810 may follow a policy that specifies the conditions that are to be met before authenticating the optical disc 102. Specifically, a policy may provide that a certain percentage of attempts to verify the multi-spiral structure 104 at 806 are to be successful attempts, where some small portion of unsuccessful attempts from step 806 are still acceptable. For example, a scratch on the surface of the optical disc 102 may render the known good portions unreadable in some instances when the OPU 502 attempts to read data from the spiral data tracks within the known good portions. In one illustrative example, if three out of five attempts at verifying the multi-spiral structure 104 at 806 are successful, then the device 108 may treat this as a verification at 808 to cause the disc 102 to be authenticated at 810. In some embodiments, such a policy may specify that the verification attempt at 806 never result in a successful identification of an incorrect known good portion. In other words, even where valid portions of a multi-spiral structure 104 are perfectly readable, if the result of step 806 is one where it is determined that the multi-spiral structure 104 does not match the encrypted data, the policy may treat this as not verified at 808, regardless of the number of attempts at 806.

Figure 9:
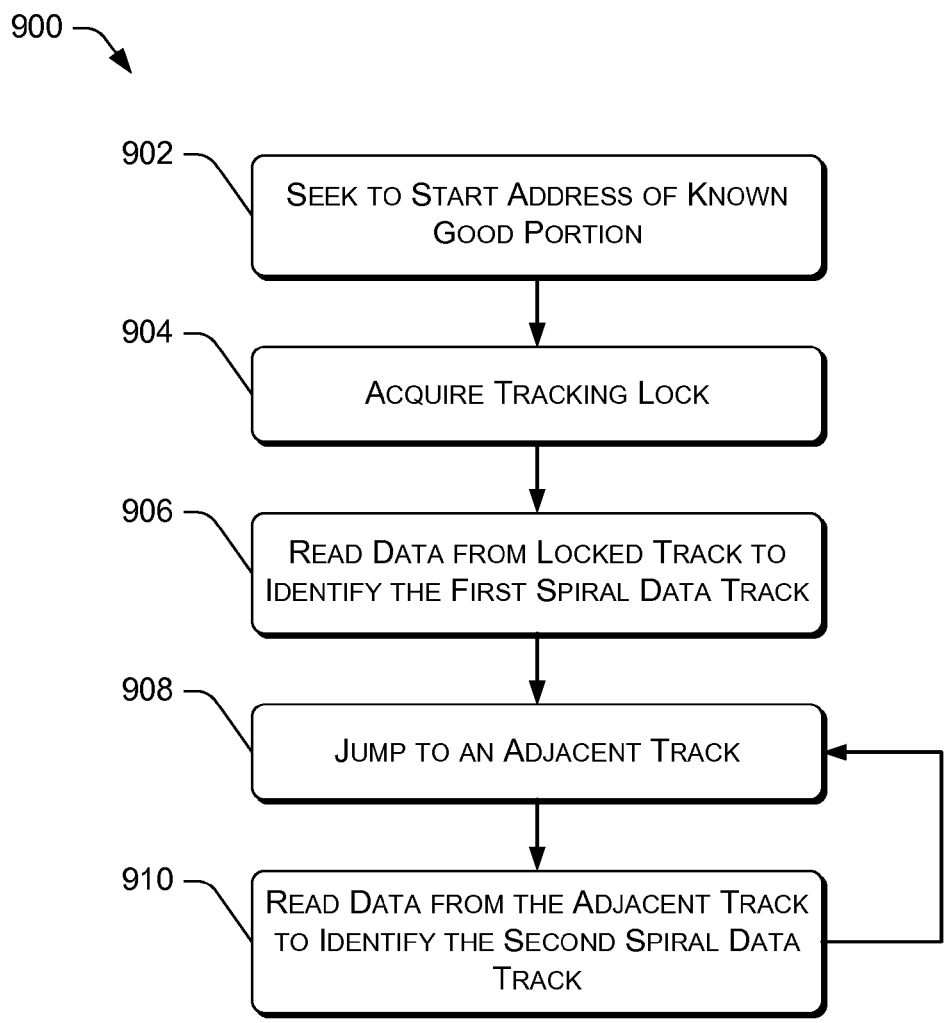
FIG. 9 is a flow diagram of an illustrative process 900 for verifying a stochastic anti-piracy feature on an optical disc.

FIG. 9 is a flow diagram of an illustrative process 900 for verifying a stochastic anti-piracy feature on an optical disc 102. For discussion purposes, the process 900 is described with reference to the architecture 100 of FIG. 1 and the optical disc reading device 108(1) of FIG. 5. Particular reference is made to the optical disc maker drive 500 and the components associated with the optical disc drive 500.

At 902, the OPU 502 of the optical disc drive 500 may seek to a start address of a known good portion 404, such as the start address, A1, shown in FIG. 4. The verification parameters 120 may include the start address of the known good portion 404. The firmware 508 may include instructions that the controller 506 executes to control the OPU 502 to seek to the start address at 902.

At 904, the OPU 502 may acquire a tracking lock on a track at the start address, A1. The tracking lock may be part of a closed tracking loop readout technique to maintain a focus of a laser spot of the OPU 502 on the track when reading out data from the track. Assuming the OPU 502 does not lose tracking, it does not switch from one track to another after a tracking lock has been acquired or established. The track that the OPU 502 locks to may be any one of the two or more spiral data tracks that make up the multi-spiral structure 104. For example, the OPU 502 may acquire a tracking lock on the first spiral data track 400, without knowing whether the locked track is in fact the first spiral data track 400.

At 906, the OPU 502 may read data from first spiral data track 400 to identify the track as the first spiral data track 400. That is, data may be written to the first spiral data track 400 that is indicative of first spiral data track 400, such that the data of the track itself acts as an identifier for the track. In this manner, the OPU 502 may read data from the track in order to identify the track. The reading at 906 also acts as a verification step to make sure that data is actually readable at the start address (i.e., the track is not overlapped by another spiral data track. Thus, step 906 can serve to confirm that the locked track is not overlapping with another track, and also to identify the track itself.

At 908, a track jump is performed based on a track jump signal from the controller 506 to cause the OPU 502 to jump from the first spiral data track 400 to an adjacent track. The direction of the track jump at 908 may be radially outward with respect to a center of the optical disc 102 such that the adjacent track is closer to an outer periphery of the optical disc 102. The OPU 502 may not know whether the adjacent track is the same first spiral data track 400 or a different spiral data track until it reads data from the adjacent track.

Accordingly, at 910, the OPU 502 may read data from the adjacent track to identify the adjacent track as the second spiral data track 402. If the data read from the adjacent track is what is expected from the second spiral data track 402, the process 900 may serve to verify that the feature on the optical disc 102 is not simply a single spiral structure, but rather a multi-spiral structure 104 because two or more spiral data tracks have been interleaved in known good portions 404 of the multi-spiral structure 104. On the other hand, if the data of the adjacent track indicates that the adjacent track is still the first spiral data track 400, the verification process 900 serves to identify those instances in which the multi-spiral structure 104 does not match the encrypted data. That is, if the encrypted data (i.e., the verification parameters 120) specify that there is a known good portion 404 at a certain location (e.g., a start address, A1) on the optical disc 102, a track jump performed at that location confirms that there are in fact multiple interleaved spiral data tracks at that location.

In some embodiments, the process 900 may iterate steps 908 and 910 over multiple track jumps to increase the confidence that a known good portion 404 in fact contains interleaved spiral data tracks, rather than a single spiral data track with multiple turns/loops. In this scenario, after the second spiral data track 402 is identified at 910, the OPU 502 may perform another track jump at 908 to a next adjacent track, and then read data from the next adjacent track to confirm that the next adjacent track is in fact the first spiral data track 400. The result of two successive track jumps would be a confirmation that a turn/loop of the second spiral data track 402 is interposed between two successive turns/loops of the first spiral data track 400. This, of course, may be repeated any suitable number of times to confirm with higher and higher confidence that a multi-spiral structure 104 is present. It is again appreciated that a tradeoff exists between heightened security through a higher number of iterations of steps 908 and 910 and user friendliness.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Example One

A method comprising: accessing encrypted data (e.g., cryptographically signed verification parameters 120) for verifying a multi-spiral structure (e.g., a dual-spiral structure) on a portion of an optical disc, the multi-spiral structure comprising partially interleaved, and partially overlapping, spiral data tracks having different track pitches; decrypting the encrypted data to obtain verification parameters (e.g., start address, end address, length, etc., of one or more known good portions 404 of the multi-spiral structure); determining whether characteristics of the multi-spiral structure correspond to the verification parameters; and authenticating the optical disc in response to verifying the characteristics of the multi-spiral structure, the characteristics of the multi-spiral structure being verified based on the characteristics of the multi-spiral structure corresponding to the verification parameters.

Example Two

The method of Example One, wherein the verification parameters comprise a first address (e.g., a start address, an end address, etc.) of a portion of the multi-spiral structure where the second spiral data track is interleaved with, and not overlapping with, the first spiral data track, such that the first and the second spiral data tracks are readable by an optical pickup within the portion.

Example Three

The method of any of the previous examples, alone or in combination, wherein the determining whether characteristics of the multi-spiral structure correspond to the verification parameters comprises: acquiring a tracking lock on a track at the first address; reading data from the track to identify the track as the first spiral data track; jumping, by the optical pickup, from the first spiral data track to an adjacent track; and reading data from the adjacent track to identify the adjacent track as the second spiral data track.

Example Four

The method of any of the previous examples, alone or in combination, wherein the verification parameters further comprise a second address of the portion, and wherein the determining whether the characteristics of the multi-spiral structure correspond to the verification parameters further comprises verifying that the portion exists between the first address and the second address by confirming that data is readable from at least one of the first or the second spiral data tracks within the portion, and that data is not readable before the first address and after the second address.

Example Five

The method of any of the previous examples, alone or in combination, wherein the verification parameters comprise multiple first addresses of multiple portions of the multi-

Example Six

The method of any of the previous examples, alone or in combination, wherein the verifying characteristics of the multi-spiral structure comprises performing a track jump to another adjacent track and reading data from the other adjacent track.

Example Seven

The method of any of the previous examples, alone or in combination, wherein the encrypted data includes verification parameters for a plurality of multi-spiral structures on the optical disc, and wherein the authenticating the optical disc is based on verifying characteristics of the plurality of multi-spiral structures.

Example Eight

The method of any of the previous examples, alone or in combination, wherein the accessing the encrypted data comprises retrieving the encrypted data from a burst cutting area of the optical disc.

Example Nine

The method of any of the previous examples, alone or in combination, further comprising determining whether a signature associated with the encrypted data originated from a trusted authority.

Example Ten

The method of any of the previous examples, alone or in combination, wherein the optical disc includes content for a video game, the method further comprising detecting, by reading data from a particular sector of the optical disc, that the optical disc is a game disc including the content for a video game.

Example Eleven

The method of any of the previous examples, alone or in combination, wherein the authenticating the optical disc is conditioned on successfully verifying the characteristics of the multi-spiral structure at least a threshold number of times out of a predetermined number of attempts at verifying the characteristics of the multi-spiral structure.

Example Twelve

An optical disc comprising: a first area having main content of the optical disc; and a second area having a multi-spiral structure comprising a first spiral data track partially interleaved with, and partially overlapping, a second spiral data track, the first and the second spiral data tracks having different track pitches.

spiral structure, and wherein the verifying the characteristics of the multi-spiral structure further comprises verifying that the multi-spiral structure comprises the multiple known good portions.

Example Thirteen

The optical disc of Example Twelve, further comprising encrypted data that indicates one or more characteristics of the multi-spiral structure.

Example Fourteen

The optical disc of any of the previous examples, alone or in combination, wherein the encrypted data is provided in a burst cutting area of the optical disc.

Example Fifteen

The optical disc of any of the previous examples, alone or in combination, wherein the encrypted data includes at least one of a start address or an end address of a readable portion of the multi-spiral structure.

Example Sixteen

The optical disc of any of the previous examples, alone or in combination, further comprising a plurality of data layers, wherein the main content and the multi-spiral structure are provided on a first data layer of the plurality of data layers, and wherein the encrypted data is provided on a second data layer of the plurality of layers.

Example Seventeen

The optical disc of any of the previous examples, alone or in combination, wherein a percent difference between the different track pitches is at least about 3.5%.

Example Eighteen

The optical disc of any of the previous examples, alone or in combination, wherein the first area is closer to a center of the optical disc than the second area is to the center of the optical disc.

Example Nineteen

The optical disc of any of the previous examples, alone or in combination, wherein the multi-spiral structure in the second area is a first multi-spiral structure, the optical disc further comprising a third area having a second multi-spiral structure.

Example Twenty

A method of manufacturing an optical disc comprising: forming a substrate for the optical disc; forming, in a designated area of the substrate, a first spiral data track having a first track pitch; forming, in the designated area, a second spiral data track having a second track pitch that is different than the first track pitch such that the second spiral data track is partially interleaved with, and partially overlaps, the first spiral data track to form a multi-spiral structure in the designated area; analyzing the multi-spiral structure to determine verification parameters for verifying the multi-spiral structure; and encrypting the verification parameters.

Example Twenty-One

The method of Example Twenty, further comprising adding the encrypted verification parameters to a burst cutting area of the optical disc.

Example Twenty-Two

The method of any of the previous examples, alone or in combination, wherein the optical disc comprises a plurality of data layers and a first data layer of the plurality of data layers comprises the multi-spiral structure, the method further comprising adding the encrypted verification parameters to a second data layer of the plurality of data layers.

Example Twenty-Three

The method of any of the previous examples, alone or in combination, further comprising storing the encrypted verification parameters in a storage location that is accessible over a network.

Example Twenty-Four

The method of any of the previous examples, alone or in combination, wherein a percent difference between the first track pitch and the second track pitch is at least about 3.5%.

Example Twenty-Five

The method of any of the previous examples, alone or in combination, wherein the analyzing the multi-spiral structure comprises: following, by an optical pickup, at least one of the first spiral data track or the second spiral data track while attempting to read data from the at least one of the first or second spiral data tracks; locating a valid portion of the multi-spiral structure where the data is readable from the at least one of the first or second spiral data tracks; in response to the locating the valid portion, seeking backward along the at least one of the first or second spiral data tracks to a first location where the data is no longer readable; designating the first location as a start address of the valid portion of the multi-spiral structure; seeking forward along the at least one of the first or second spiral data tracks to a second location where the data is no longer readable; and designating the second location as an end address of the valid portion.

Example Twenty-Six

The method of any of the previous examples, alone or in combination, wherein the verification parameters include the start address and the end address.

Example Twenty-Seven

The method of any of the previous examples, alone or in combination, wherein the encrypting the verification parameters is based at least in part on using a private key of a public key encryption function.

Example Twenty-Eight

The method of any of the previous examples, alone or in combination, further comprising: forming, in another designated area of the substrate, a third spiral data track having a third track pitch; forming, in the other designated area, a fourth spiral data track having a fourth track pitch that is different than the third track pitch such that the fourth spiral data track is partially interleaved with, and partially overlaps, the third spiral data track to create another multi-spiral structure in the other designated area; analyzing the other multi-spiral structure to determine other verification parameters for verifying the other multi-spiral structure; and wherein the encrypting further comprises encrypting the other verification parameters.

Example Twenty-Nine

A system comprising: means for accessing encrypted data (e.g., an optical pickup unit 502, communication connection(s) 526, etc.), the encrypted data being usable for verifying a multi-spiral structure on a portion of an optical disc, the multi-spiral structure comprising partially interleaved, and partially overlapping, spiral data tracks having different track pitches; means for decrypting the encrypted data (e.g., the disc verification module 514) to obtain verification parameters; means for verifying characteristics of the multi-spiral structure (e.g., an optical pickup unit (OPU) 502, firmware 508, the disc verification module 514, and/or the networked storage server 124) using the verification parameters to authenticate the optical disc.

Example Thirty

One or more computer-readable media storing computer-executable instructions that, when executed by a processor, perform acts comprising: accessing encrypted data (e.g., cryptographically signed verification parameters 120) for verifying a multi-spiral structure (e.g., a dual-spiral structure) on a portion of an optical disc, the multi-spiral structure comprising partially interleaved, and partially overlapping, spiral data tracks having different track pitches; decrypting the encrypted data to obtain verification parameters (e.g., start address, end address, length, etc., of one or more known good portions 404 of the multi-spiral structure); determining whether characteristics of the multi-spiral structure correspond to the verification parameters; and authenticating the optical disc in response to verifying the characteristics of the multi-spiral structure, the characteristics of the multi-spiral structure being verified based on the characteristics of the multi-spiral structure corresponding to the verification parameters.

Example Thirty-One

The one or more computer-readable media of Example Thirty, wherein the verification parameters comprise a first address (e.g., a start address, an end address, etc.) of a portion of the multi-spiral structure where the second spiral data track is interleaved with, and not overlapping with, the first spiral data track, such that the first and the second spiral data tracks are readable by an optical pickup within the portion.

Example Thirty-Two

The one or more computer-readable media of any of the previous examples, alone or in combination, wherein the determining whether the characteristics of the multi-spiral structure correspond to the verification parameters comprises: acquiring a tracking lock on a track at the first address; reading data from the track to identify the track as the first spiral data track; jumping, by the optical pickup, from the first spiral data track to an adjacent track; and reading data from the adjacent track to identify the adjacent track as the second spiral data track.

Example Thirty-Three

The one or more computer-readable media of any of the previous examples, alone or in combination, wherein the verification parameters further comprise a second address of the portion, and wherein the determining whether the characteristics of the multi-spiral structure correspond to the verification parameters further comprises verifying that the portion exists between the first address and the second address by confirming that data is readable from at least one of the first or the second spiral data tracks within the portion, and that data is not readable before the first address and after the second address.

Example Thirty-Four

The one or more computer-readable media of any of the previous examples, alone or in combination, wherein the verification parameters comprise multiple first addresses of multiple portions of the multi-spiral structure, and wherein the verifying the characteristics of the multi-spiral structure further comprises verifying that the multi-spiral structure comprises the multiple known good portions.

Example Thirty-Five

The one or more computer-readable media of any of the previous examples, alone or in combination, wherein the verifying the characteristics of the multi-spiral structure comprises performing a track jump to another adjacent track and reading data from the other adjacent track.

Example Thirty-Six

The one or more computer-readable media of any of the previous examples, alone or in combination, wherein the encrypted data includes verification parameters for a plurality of multi-spiral structures on the optical disc, and wherein the authenticating the optical disc is based on verifying characteristics of the plurality of multi-spiral structures.

Example Thirty-Seven

The one or more computer-readable media of any of the previous examples, alone or in combination, wherein the accessing the encrypted data comprises retrieving the encrypted data from a burst cutting area of the optical disc.

Example Thirty-Eight

The one or more computer-readable media of any of the previous examples, alone or in combination, the acts further comprising determining whether a signature associated with the encrypted data originated from a trusted authority.

Example Thirty-Nine

The one or more computer-readable media of any of the previous examples, alone or in combination, wherein the optical disc includes content for a video game, the acts further comprising detecting, by reading data from a particular sector of the optical disc, that the optical disc is a game disc including the content for a video game.

Example Forty

The one or more computer-readable media of any of the previous examples, alone or in combination, wherein the authenticating the optical disc is conditioned on successfully verifying the characteristics of the multi-spiral structure at least a threshold number of times out of a predetermined number of attempts at verifying the characteristics of the multi-spiral structure.

Example Forty-One

A system comprising: An optical pickup unit to access encrypted data, the encrypted data being usable for verifying a multi-spiral structure on a portion of an optical disc, the multi-spiral structure comprising partially interleaved, and partially overlapping, spiral data tracks having different track pitches; a disc verification module to decrypt the encrypted data to obtain verification parameters; the optical pickup unit being further configured to verify, using the verification parameters, characteristics of the multi-spiral structure by accessing firmware of an optical disc reading device, the system being configured to authenticate the optical disc based on the verifying the characteristics of the multi-spiral structure.

Example Forty-Two

The system of Example Forty-One, wherein the verification parameters comprise a first address (e.g., a start address, an end address, etc.) of a portion of the multi-spiral structure where the second spiral data track is interleaved with, and not overlapping with, the first spiral data track, such that the first and the second spiral data tracks are readable by an optical pickup within the portion.

Example Forty-Three

The system of any of the previous examples, alone or in combination, wherein the optical pickup unit is configured to verify the characteristics of the multi-spiral structure by: acquiring a tracking lock on a track at the first address; reading data from the track to identify the track as the first spiral data track; jumping, by the optical pickup, from the first spiral data track to an adjacent track; and reading data from the adjacent track to identify the adjacent track as the second spiral data track.

Example Forty-Four

The system of any of the previous examples, alone or in combination, wherein the verification parameters further comprise a second address of the portion, and wherein the optical pickup unit is further configured to verify that the portion exists between the first address and the second address by confirming that data is readable from at least one of the first or second spiral data tracks within the portion, and that data is not readable before the first address and after the second address.

Example Forty-Five

The system of any of the previous examples, alone or in combination, wherein the verification parameters comprise multiple first addresses of multiple portions of the multi-spiral structure, and wherein the optical pickup unit is further configured to verify the characteristics of the multi-spiral structure by verifying that the multi-spiral structure comprises the multiple known good portions.

Example Forty-Six

The system of any of the previous examples, alone or in combination, wherein the optical pickup unit is further configured to verify the characteristics of the multi-spiral structure by performing a track jump to another adjacent track and reading data from the other adjacent track.

Example Forty-Seven

The system of any of the previous examples, alone or in combination, wherein the encrypted data includes verification parameters for a plurality of multi-spiral structures on the optical disc, and wherein the system is configured to authenticate the optical disc based on verifying the characteristics of the plurality of multi-spiral structures.

Example Forty-Eight

The system of any of the previous examples, alone or in combination, wherein the optical pickup unit is further configured to access the encrypted data by retrieving the encrypted data from a burst cutting area of the optical disc.

Example Forty-Nine

The system of any of the previous examples, alone or in combination, wherein the system is further configured to determine whether a signature associated with the encrypted data originated from a trusted authority.

Example Fifty

The system of any of the previous examples, alone or in combination, wherein the optical disc includes content for a video game, and wherein the optical pickup unit is further configured to detect, by reading data from a particular sector of the optical disc, that the optical disc is a game disc including the content for a video game.

Example Fifty-One

The system of any of the previous examples, alone or in combination, wherein the system is configured to authenticate the optical disc based on successfully verifying the characteristics of the multi-spiral structure at least a threshold number of times out of a predetermined number of attempts at verifying the characteristics of the multi-spiral structure.

Example Fifty-Two

One or more computer-readable media storing computer-executable instructions that, when executed by a processor, perform acts comprising: forming a substrate for the optical disc; forming, in a designated area of the substrate, a first spiral data track having a first track pitch; forming, in the designated area, a second spiral data track having a second track pitch that is different than the first track pitch such that the second spiral data track is partially interleaved with, and partially overlaps, the first spiral data track to form a multi-spiral structure in the designated area; analyzing the multi-spiral structure to determine verification parameters for verifying the multi-spiral structure; and encrypting the verification parameters.

Example Fifty-Three

The one or more computer-readable media of Example Fifty-Two, the acts further comprising adding the encrypted verification parameters to a burst cutting area of the optical disc.

Example Fifty-Four

The one or more computer-readable media of any of the previous examples, alone or in combination, wherein the optical disc comprises a plurality of data layers and a first data layer of the plurality of data layers comprises the multi-spiral structure, the acts further comprising adding the encrypted verification parameters a to second data layer of the plurality of data layers.

Example Fifty-Five

The one or more computer-readable media of any of the previous examples, alone or in combination, the acts further comprising storing the encrypted verification parameters in a storage location that is accessible over a network.

Example Fifty-Six

The one or more computer-readable media of any of the previous examples, alone or in combination, wherein a percent difference between the first track pitch and the second track pitch is at least about 3.5%.

Example Fifty-Seven

The one or more computer-readable media of any of the previous examples, alone or in combination, wherein the analyzing the multi-spiral structure comprises: following, by an optical pickup, at least one of the first spiral data track or the second spiral data track while attempting to read data from the at least one of the first or second spiral data tracks; locating a valid portion of the multi-spiral structure where the data is readable from the at least one of the first or second spiral data tracks; in response to the locating the valid portion, seeking backward along the at least one of the first or second spiral data tracks to a first location where the data is no longer readable; designating the first location as a start address of the valid portion of the multi-spiral structure; seeking forward along the at least one of the first or second spiral data tracks to a second location where the data is no longer readable; and designating the second location as an end address of the valid portion.

Example Fifty-Eight

The one or more computer-readable media of any of the previous examples, alone or in combination, wherein the verification parameters include the start address and the end address.

Example Fifty-Nine

The one or more computer-readable media of any of the previous examples, alone or in combination, wherein the encrypting the verification parameters is based at least in part on using a private key of a public key encryption function.

Example Sixty

The one or more computer-readable media of any of the previous examples, alone or in combination, the acts further comprising: forming, in another designated area of the substrate, a third spiral data track having a third track pitch; forming, in the other designated area, a fourth spiral data track having a fourth track pitch that is different than the third track pitch such that the fourth spiral data track is partially interleaved with, and partially overlaps, the third spiral data track to create another multi-spiral structure in the other designated area; analyzing the other multi-spiral structure to determine other verification parameters for verifying the other multi-spiral structure; and wherein the encrypting further comprises encrypting the other verification parameters.

Example Sixty-One

A manufacturing system for manufacturing an optical disc comprising: a substrate forming component (e.g., an injection molding apparatus) to form a substrate for the optical disc; a laser beam recorder (LBR) to: form, in a designated area of the substrate, a first spiral data track having a first track pitch; form, in the designated area, a second spiral data track having a second track pitch that is different than the first track pitch such that the second spiral data track is partially interleaved with, and partially overlaps, the first spiral data track to form a multi-spiral structure in the designated area; an optical pickup to analyze the multi-spiral structure to determine verification parameters for verifying the multi-spiral structure; and an encryption module to encrypt the verification parameters.

Example Sixty-Two

The system of Example Sixty-One, wherein the LBR is further configured to add the encrypted verification parameters to a burst cutting area of the optical disc.

Example Sixty-Three

The system of any of the previous examples, alone or in combination, wherein the optical disc comprises a plurality of data layers and a first data layer of the plurality of data layers comprises the multi-spiral structure, and wherein the LBR is further configured to add the encrypted verification parameters to a second data layer of the plurality of data layers.

Example Sixty-Four

The system of any of the previous examples, alone or in combination, further comprising a storage location that is accessible over a network to store the encrypted verification parameters.

Example Sixty-Five

The system of any of the previous examples, alone or in combination, wherein a percent difference between the first track pitch and the second track pitch is at least about 3.5%.

Example Sixty-Six

The system of any of the previous examples, alone or in combination, wherein the optical pickup is further configured to analyze the multi-spiral structure by: following at least one of the first spiral data track or the second spiral data track while attempting to read data from the at least one of the first or second spiral data tracks; locating a valid portion of the multi-spiral structure where the data is readable from the at least one of the first or second spiral data tracks; in response to the locating the valid portion, seeking backward along the at least one of the first or second spiral data tracks to a first location where the data is no longer readable; designating the first location as a start address of the valid portion of the multi-spiral structure; seeking forward along the at least one of the first or second spiral data tracks to a second location where the data is no longer readable; and designating the second location as an end address of the valid portion.

Example Sixty-Seven

The system of any of the previous examples, alone or in combination, wherein the verification parameters include the start address and the end address.

Example Sixty-Eight

The system of any of the previous examples, alone or in combination, wherein the verification parameters are encrypted based at least in part on using a private key of a public key encryption function.

Example Sixty-Nine

The system of any of the previous examples, alone or in combination, wherein the LBR is further configured to: form, in another designated area of the substrate, a third spiral data track having a third track pitch; form, in the other designated area, a fourth spiral data track having a fourth track pitch that is different than the third track pitch such that the fourth spiral data track is partially interleaved with, and partially overlaps, the third spiral data track to create another multi-spiral structure in the other designated area; and wherein the optical pickup is further configured to analyze the other multi-spiral structure to determine other verification parameters for verifying the other multi-spiral structure; and wherein the other verification parameters are encrypted.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. An optical disc comprising:
a first area having main content of the optical disc; and
a second area having a multi-spiral structure comprising a first spiral data track partially interleaved with, and partially overlapping, a second spiral data track, the first and the second spiral data tracks having different track pitches, wherein:

an overlapping portion of the multi-spiral structure includes a first portion of the first spiral data track overlapping a first portion of the second spiral data track; and an interleaving portion of the multi-spiral structure includes a second portion of the second spiral data track interposed between successive turns of the first spiral data track that are not in the first portion of the first spiral data track.

2. The optical disc of claim 1, wherein a percent difference between the different track pitches is at least about 3.5%.

3. The optical disc of claim 1, wherein data written to the first portion of the first spiral data track and to the first portion of the second spiral data track is not readable by an optical pickup due to the first portion of the first spiral data track overlapping the first portion of the second spiral data track.

4. The optical disc of claim 1, further comprising encrypted data that indicates one or more characteristics of the multi-spiral structure.

5. The optical disc of claim 4, wherein the encrypted data includes at least one of a start address or an end address of a readable portion of the multi-spiral structure.

6. The optical disc of claim 4, further comprising a plurality of data layers, wherein the main content and the multi-spiral structure are provided on a first data layer of the plurality of data layers, and the encrypted data is provided on a second data layer of the plurality of data layers.

7. An optical disc comprising:
a first area having main content of the optical disc; and
a second area having a multi-spiral structure comprising a first spiral data track having a first track pitch and a second spiral data track having a second track pitch that is different from the first track pitch, wherein:
a first portion of the multi-spiral structure includes a first portion of the first spiral data track overlapping a first portion of the second spiral data track; and
a second portion of the multi-spiral structure includes a second portion of the second spiral data track interposed between successive turns of the first spiral data track that are not in the first portion of the first spiral data track.

8. The optical disc of claim 7, wherein a percent difference between the first track pitch and the second track pitch is at least about 3.5%.

9. The optical disc of claim 7, further comprising encrypted data that indicates one or more characteristics of the multi-spiral structure.

10. The optical disc of claim 9, wherein the encrypted data includes at least one of a start address or an end address of the second portion of the multi-spiral structure, the second portion comprising a readable portion of the multi-spiral structure.

11. The optical disc of claim 9, further comprising a plurality of data layers, wherein the main content and the multi-spiral structure are provided on a first data layer of the plurality of data layers, and the encrypted data is provided on a second data layer of the plurality of data layers.

12. An optical disc comprising:
a first area having main content of the optical disc; and
a second area having a pattern defined by a first spiral data track of a first track pitch partially interleaving, and partially overlapping, a second spiral data track of a second track pitch that is different from the first track pitch, wherein:
an overlapping portion of the pattern includes a first portion of the first spiral data track overlapping a first portion of the second spiral data track; and
an interleaving portion of the pattern includes a second portion of the second spiral data track interposed between successive turns of the first spiral data track that are not in the first portion of the first spiral data track.

13. The optical disc of claim 12, wherein a percent difference between the first track pitch and the second track pitch is at least about 3.5%.

14. The optical disc of claim 12, further comprising encrypted data that indicates one or more characteristics of the pattern.

15. The optical disc of claim 14, wherein the encrypted data includes at least one of a start address or an end address of a readable portion of the pattern.

16. The optical disc of claim 14, further comprising a plurality of data layers, wherein the main content and the pattern are provided on a first data layer of the plurality of data layers, and the encrypted data is provided on a second data layer of the plurality of data layers.

* * * * *